US012739531B2

(12) United States Patent
Nagai

(10) Patent No.: US 12,739,531 B2
(45) Date of Patent: Sep. 15, 2026

(54) DEPTH IMAGE SENSING DEVICE, IMAGE SIGNAL PROCESSOR AND IMAGE SIGNAL PROCESSING METHOD

(71) Applicant: SK hynix Inc., Icheon-si (KR)

(72) Inventor: Toshiaki Nagai, Tokyo (JP)

(73) Assignee: SK hynix Inc., Icheon-si (KR)

( * ) Notice: Subject to any disclaimer, the term of this patent is extended or adjusted under 35 U.S.C. 154(b) by 218 days.

(21) Appl. No.: 18/396,297

(22) Filed: Dec. 26, 2023

(65) Prior Publication Data

US 2025/0008235 A1 Jan. 2, 2025

(30) Foreign Application Priority Data

Jun. 30, 2023 (KR) ........................ 10-2023-0085019

(51) Int. Cl.

| | |
|---|---|
| ***H04N 25/705*** | (2023.01) |
| ***G01S 7/4865*** | (2020.01) |
| ***G01S 17/894*** | (2020.01) |
| ***H04N 25/44*** | (2023.01) |
| ***H04N 25/46*** | (2023.01) |

(52) U.S. Cl.

CPC ......... *H04N 25/705* (2023.01); *G01S 7/4865* (2013.01); *G01S 17/894* (2020.01); *H04N 25/44* (2023.01); *H04N 25/46* (2023.01)

(58) Field of Classification Search

CPC ...... H04N 25/705; H04N 25/44; H04N 25/46; H04N 25/48; H04N 25/71; H04N 25/76; G01S 7/4865; G01S 17/894

See application file for complete search history.

(56) References Cited

U.S. PATENT DOCUMENTS

| | | | | |
|---|---|---|---|---|
| 10,586,343 | B1 * | 3/2020 | Whelan | G06T 7/521 |
| 11,676,293 | B2 * | 6/2023 | Hegarty | G06V 10/143<br>382/106 |
| 2011/0129123 | A1 | 6/2011 | Ovsiannikov et al. | |
| 2019/0008137 | A1 | 1/2019 | Shapiro et al. | |

FOREIGN PATENT DOCUMENTS

| | | | |
|---|---|---|---|
| KR | 102402477 | B1 | 5/2022 |
| WO | 2021075340 | A1 | 4/2021 |
| WO | 2022058280 | A1 | 3/2022 |

* cited by examiner

*Primary Examiner* — Seung C Sohn

(74) *Attorney, Agent, or Firm* — WILLIAM PARK AND ASSOCIATES LTD.

(57) ABSTRACT

A depth image sensing device includes a line memory configured to store depth data, in units of a line group, generated by detecting a dot pattern light reflected from a scene, a dot center pixel detector configured to determine a dot center pixel having a highest intensity of depth data in each of a plurality of kernels included in the line group, and a dot data memory configured to store dot center pixel information including a position of the dot center pixel.

9 Claims, 21 Drawing Sheets

DEPTH IMAGE SENSING DEVICE, IMAGE SIGNAL PROCESSOR AND IMAGE SIGNAL PROCESSING METHOD

CROSS-REFERENCE TO RELATED APPLICATION

This patent document claims the priority and benefits of Korean patent application No. 10-2023-0085019, filed on Jun. 30, 2023, in the Korean Intellectual Property Office, the disclosure of which is incorporated herein by reference in its entirety as part of the disclosure of this patent document.

TECHNICAL FIELD

The technology and embodiments disclosed in this patent document generally relate to a depth image sensing device capable of processing information about a scene and information about a distance to the scene, an image signal processor, and an image signal processing method.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various devices such as smart phones, digital cameras, game machines, IoT (Internet of Things), robots, security cameras and medical micro-cameras.

The image sensing device may be used to acquire a color image of the scene or a depth image of the scene. The image sensing device capable of acquiring a depth image may use a separate light source, and a significant amount of power may be consumed to operate the separate light source.

In particular, when the image sensing device is mounted on a mobile device, reducing power consumption required to operate the light source has emerged as an important issue.

SUMMARY

In accordance with an embodiment of the disclosed technology, a depth image sensing device may include a line memory configured to store depth data, in units of a line group, generated by detecting a dot pattern light reflected from a scene; a dot center pixel detector configured to determine a dot center pixel having a highest intensity of depth data in each of a plurality of kernels included in the line group; and a dot data memory configured to store dot center pixel information including a position of the dot center pixel.

In accordance with another embodiment of the disclosed technology, an image signal processor may include a dot center pixel detector configured to determine a dot center pixel having a highest intensity of depth data in each of a plurality of kernels; and a depth image generator configured to calculate a distance to a scene using the depth data of the dot center pixel.

In accordance with another embodiment of the disclosed technology, an image signal processing method may include determining at least one dot center pixel having a highest intensity of depth data in each of a plurality of kernels; determining whether the dot center pixel is a valid pixel by comparing the intensity of the depth data of the dot center pixel with a valid threshold value; removing an overlapped dot center pixel from among the dot center pixels, which are valid pixels; and calculating a distance to a scene using the depth data of the dot center pixel.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
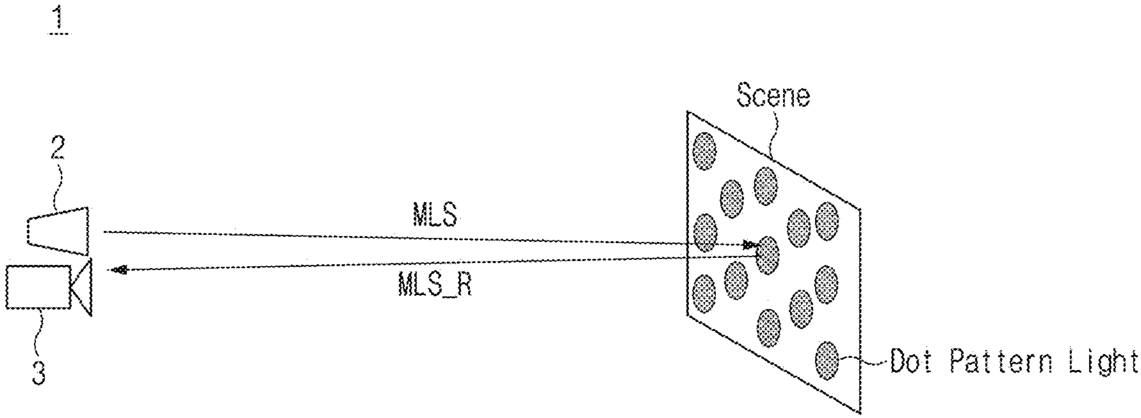
FIG. 1 is a schematic diagram illustrating an example of an imaging device based on some embodiments of the disclosed technology.

This patent document provides embodiments and examples of a depth image sensing device capable of processing information about a scene and information about a distance to the scene, an image signal processor, and an image signal processing method, that may be used in configurations to substantially address one or more technical or engineering issues and to mitigate limitations or disadvantages encountered in some other image sensing devices. Some embodiments of the disclosed technology relate to a depth image sensing device capable of improving depth sensing performance while reducing power consumption required to operate a light source, an image signal processor, and an image signal processing method. The disclosed technology provides various embodiments of the depth image sensing device capable of efficiently and accurately detecting the distance regardless of a scene, an image signal processor, and an image signal processing method.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Various embodiments of the disclosed technology relate to a depth image sensing device capable of improving depth sensing performance while reducing power consumption required to operate a light source, an image signal processor, and an image signal processing method.

It is to be understood that both the foregoing general description and the following detailed description of the disclosed technology are illustrative and explanatory and are intended to provide further explanation of the disclosure as claimed.

FIG. 1 is a block diagram illustrating an example of an imaging device 1 based on some embodiments of the disclosed technology.

Referring to FIG. 1, the imaging device 1 may be a device for acquiring a depth image of a scene, and the depth image may be an image representing a sense of distance to the scene. That is, the user can visually check the distance to the scene through the depth image.

To acquire a depth image, the imaging device 1 may include a light source module 2 and a camera 3.

The light source module 2 may emit light (MLS) toward a scene, and the camera 3 may generate an electrical signal by detecting light (MLS_R) after the emitted light is reflected from the scene. A processor (not shown) provided inside or outside the camera 3 may generate a depth image based on the electrical signal generated by the camera 3.

The light source module 2 may consume significant power to emit light. In order to reduce such power consumption, the light source module 2 may emit dot pattern light to the scene. The dot pattern light may refer to a plurality of lights discontinuously irradiated in a certain region, rather than a single surface light continuously irradiated in a certain region. As a result, the dot pattern light may appear as light beams, each having a dot shape in the scene and the camera 3.

In order to accurately sense the dot pattern light, it is necessary to accurately detect the center of each dot constituting the dot pattern light. However, since each dot of the dot pattern light incident to the camera 3 has scene-dependent characteristics, it may be difficult to accurately detect the center of each dot using a fixed method. The scene-dependent characteristics may occur due to a positional difference (i.e., deviation of the dot position) between the light source module 2 and the camera 3 or may also occur due to a distance difference (i.e., deviation of the dot size) between the camera 3 and the scene. The disclosed technology illustrates a method capable of accurately sensing dot pattern light regardless of the scene-dependent characteristics of each dot.

Figure 2:
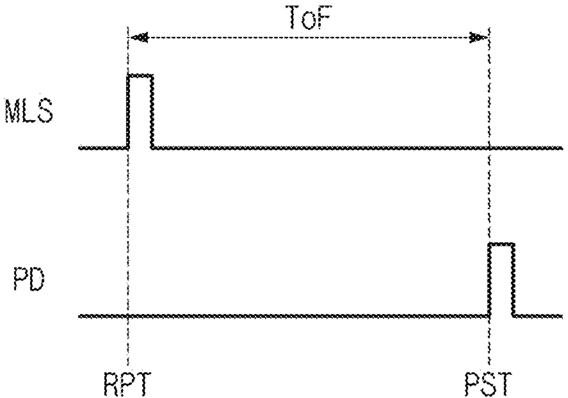
FIG. 2 is a timing diagram illustrating an example of depth data generated when the imaging device of FIG. 1 uses a direct time-of-flight (TOF) method based on some implementations of the disclosed technology.

FIG. 2 is a timing diagram illustrating an example of depth data generated when the imaging device of FIG. 1 uses a direct time-of-flight (TOF) method based on some implementations of the disclosed technology.

Referring to FIG. 2, the imaging device 1 may generate depth data that is used as a basis of a depth image by using the direct TOF method, and the direct TOF method may be a method for directly measuring a time difference between a time point at which a modulated light signal (MLS) is emitted to a scene with a time point at which a modulated light signal (MLS) is incident to the camera 3 after being reflected from the scene. In this case, the depth data may be pixel data obtained by detecting the modulated light signal (MLS) reflected from the scene.

The camera 3 may include a plurality of direct pixels for the direct TOF method. In some implementations, each of the plurality of direct pixels may be a pixel including a single photon avalanche diode (SPAD). When an electric field is increased by applying a reverse bias voltage to the SPAD, impact ionization may occur in which a pair of an electron and a hole (hereinafter referred to as an electron-hole pair) is generated while an electron generated by a photon due to the strong electric field moves. Specifically, in the SPAD operating in a Geiger mode in which a reverse bias voltage that is higher than a breakdown voltage is applied, electrons and holes generated by impact ionization caused by collision with carriers (i.e., electrons or holes) generated by incident light may collide with each other, and countless carriers can be generated. As a result, even if a single photon is incident to the SPAD, the single photon may trigger the avalanche breakdown so that a measurable current pulse can be generated.

In FIG. 2, the modulated light signal (MLS) emitted from the light source module 2 may have a pulse shape with a relatively large amplitude and a small pulse width, and a time point at which a pulse is generated, may be defined as a reference pulse time (RPT).

The light source module 2 may emit the modulated light signal (MLS) to the scene, and the camera 3 may detect light (i.e., a reflected light) reflected from the scene and may generate pixel data (PD) corresponding to a generated current pulse. In addition, the camera 3 may determine a time point at which the pixel data PD has a value equal to or greater than a threshold data value to be a pulse sensing time (PST), calculate a time-of-flight (TOF) representing a time difference between a reference pulse time (RPT) and a pulse sensing time (PST), and calculate the calculated TOF and the speed of light (luminous flux) (e.g., may multiply a value obtained by dividing the TOF by '2' by the speed of light) to calculate the distance between the scene and the camera 3.

Figure 3:
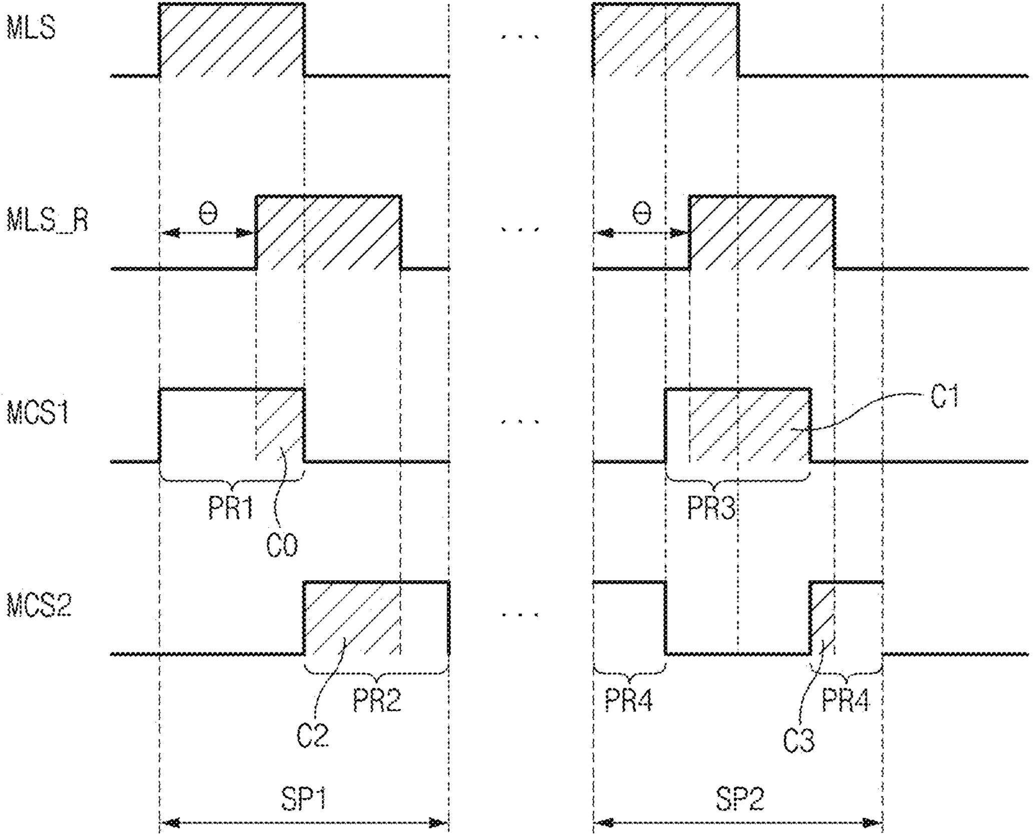
FIG. 3 is a timing diagram illustrating an example of depth data generated when the imaging device of FIG. 1 uses an indirect time-of-flight (TOF) method based on some implementations of the disclosed technology.

FIG. 3 is a timing diagram illustrating an example of depth data generated when the imaging device of FIG. 1 uses an indirect time-of-flight (TOF) method based on some implementations of the disclosed technology.

Referring to FIG. 3, the imaging device 1 may generate depth data that is used as a basis of a depth image using an indirect TOF method. The indirect TOF method may be a method for calculating a phase difference between a modulated light signal (MLS) emitted to the scene and a reflection modulated light signal (MLS_R) incident to the camera 3 after the modulated light signal (MLS) is reflected from the scene. In this case, the depth data may be pixel data corresponding to photocharges captured by a pixel controlled by a modulation control signal having a constant phase difference (e.g., 0 degrees, 90 degrees, 180 degrees, or 270 degrees) with respect to the modulated light signal (MLS).

The camera 3 may include a plurality of indirect pixels for the indirect TOF scheme. In some implementations, each of the plurality of indirect pixels may be a pixel having a 2-tap structure. A pixel having a 2-tap structure may include one photoelectric conversion element that converts incident light into photocharges, two transistors that are respectively turned on by a first modulation control signal MCS1 and a second modulation control signal MCS2 having opposite phases to transmit photocharges at different time points, and two output circuits that convert the photocharges output from the two transistors into electrical signals and output the resultant electrical signals. For example, a first modulation control signal MCS1 may have a phase difference of 0 degrees (i.e., in-phase) with respect to the modulated light signal (MLS), and a second modulation control signal MCS2 may have a phase difference of 180 degrees with respect to the modulated light signal (MLS). Alternatively, a first modulation control signal MCS1 may have a phase difference of 90 degrees with respect to the modulated light signal (MLS), and a second modulation control signal MCS2 may have a phase difference of 270 degrees with respect to the modulated light signal (MLS).

The modulated light signal (MLS), shown in FIG. 3, may have a pulse having a smaller amplitude and a larger pulse width than the modulated light signal (MLS), shown in FIG. 2. The reflection modulated light signal (MLS_R) may have a predetermined phase difference (θ) from the modulated light signal (MLS) due to a time of flight (TOF) obtained when the modulated light signal (MLS) is incident to the camera 3 after being reflected from a scene. An operation period for the camera 3 to calculate the distance to the scene may be divided into a first sensing period SP1 and a second sensing period SP2. In addition, it is assumed that the phase difference (θ) between the modulated light signal (MLS) and the reflection modulated light signal (MLS_R) is maintained to be constant during the first sensing period SP1 and the second sensing period SP2.

In the first sensing period SP1, a first modulation control signal (MCS1) may have the same phase (i.e., a phase difference of 0 degrees) as the modulated light signal (MLS). That is, the first modulation control signal (MCS1) may be in phase with the modulated light signal (MLS). Then, in a first period PR1, the first modulation control signal (MCS1) may have an activation voltage (or a logic high level). First depth data (C0) indicating the amount of photocharges generated in the first period PR1 may be generated by the first modulation control signal (MCS1) having the activation voltage.

In the first sensing period SP1, a second modulation control signal (MCS2) may have a phase (i.e., a phase difference of 180 degrees) opposite to that of the modulated light signal (MLS). Then, in a second period PR2, the second modulation control signal (MCS2) may have an activation voltage (or a logic high level). Third depth data (C2) indicating the amount of photocharges generated in the second period PR2 may be generated by the second modulation control signal (MCS2) having the activation voltage.

In the second sensing period SP2, the first modulation control signal (MCS1) may have a phase difference (i.e., a phase difference of 90 degrees) with the respect to the modulated light signal (MLS). Then, in a third period PR3, the first modulation control signal (MCS1) may have an activation voltage (or a logic high level). Second depth data (C1) indicating the amount of photocharges generated in the third period PR3 may be generated by the first modulation control signal (MCS1) having the activation voltage.

In the second sensing period SP2, the second modulation control signal (MCS2) may have a phase difference (i.e., a phase difference of 270 degrees) with the respect to the modulated light signal (MLS). Then, in a fourth period PR4, the second modulation control signal (MCS2) may have an activation voltage (or a logic high level). Fourth depth data (C3) indicating the amount of photocharges generated in the fourth period PR4 may be generated by the second modulation control signal (MCS2) having the activation voltage.

That is, the reflection modulated light signal (MLS_R) may be captured by dividing the first sensing period SP1 into the first period PR1 and the second period PR2 and may be captured by dividing the second sensing period SP2 into the third period PR3 and the fourth period PR4.

The phase difference (θ) between the modulated light signal (MLS) and the reflection modulated light signal (MLS_R) from the first to fourth depth data (C0~C3) may be calculated by Equation 1 below.

$$\theta = \tan^{-1}\frac{C1 - C3}{C0 - C2} \quad \text{[Equation 1]]}$$

In addition, a distance (d) between the camera 3 and the scene may be calculated through Equation 2 below using the phase difference (θ).

$$d = \frac{1}{2} \times \frac{c}{fm} \times \frac{\theta}{2\pi} \quad \text{[Equation 2]}$$

In Equation 2, 'c' may be the speed of light (luminous flux), and 'fm' may be a frequency of the modulated light signal (MLS).

Meanwhile, an amplitude value (amp) of the reflection modulated light signal (MLS_R) may be calculated by Equation 3 below.

$$amp = \frac{1}{2}\sqrt{(C0 - C2)^2 + (C1 - C3)^2} \quad \text{[Equation 3]}$$

In addition, a charge value (B) representing a total amount of photocharges generated by the reflection modulated light signal (MLS_R) may correspond to a sum of the first depth data and the third depth data (C0+C2) or a sum of the second depth data and the fourth depth data (C1+C3).

According to the phase difference detection method (4-phase modulation method) as shown in FIG. 3, differential values, such as (C1−C3) and/or (C0−C2), may be used to calculate the phase difference so that components caused by background noise that are included in each of the first to fourth depth data (C0~C3) can be removed, thereby more accurately calculating the distance.

Figure 4:
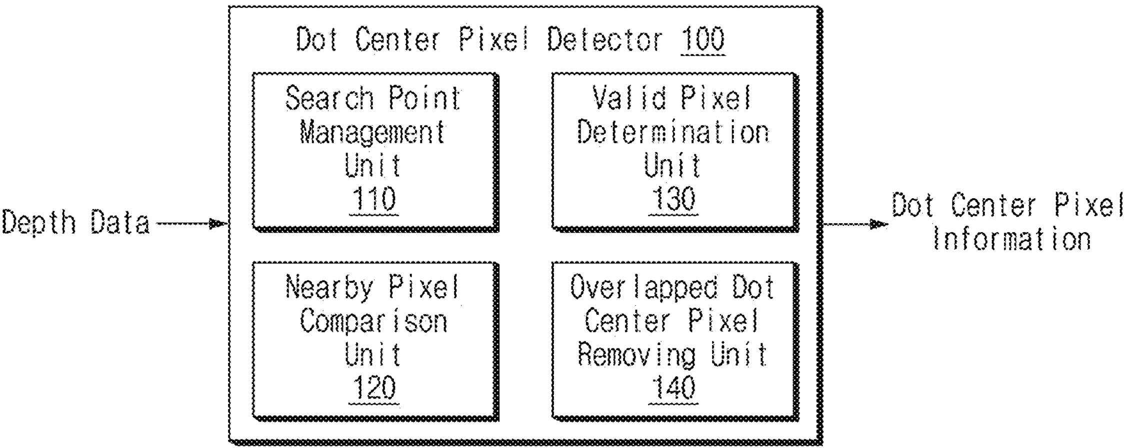
FIG. 4 is a block diagram illustrating an example of a dot center pixel detector based on some implementations of the disclosed technology.
Figure 5:
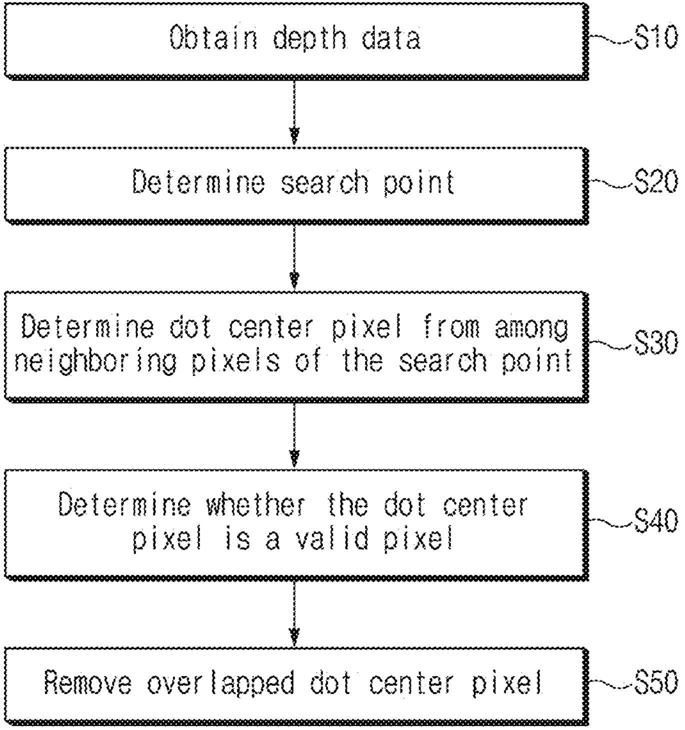
FIG. 5 is a flowchart illustrating an example of a method for operating the dot center pixel detector shown in FIG. 4 based on some implementations of the disclosed technology.
Figure 6:
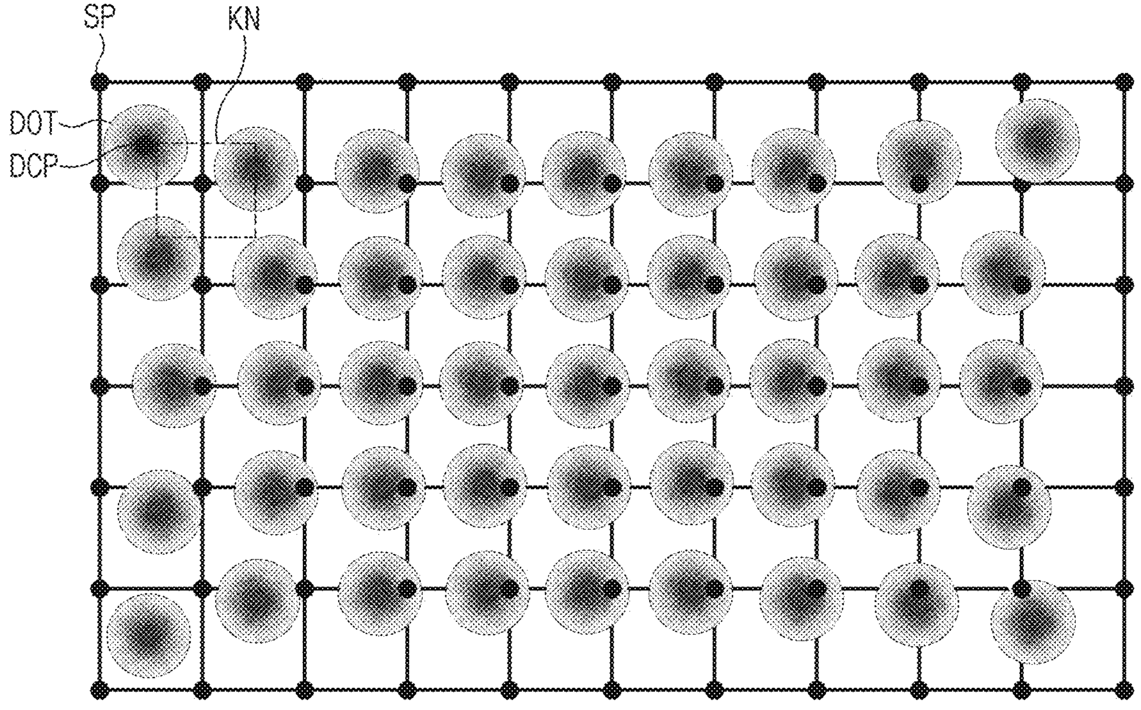
FIG. 6 is a conceptual diagram illustrating an example of an operation S20 of FIG. 5 based on some implementations of the disclosed technology.
Figure 7:
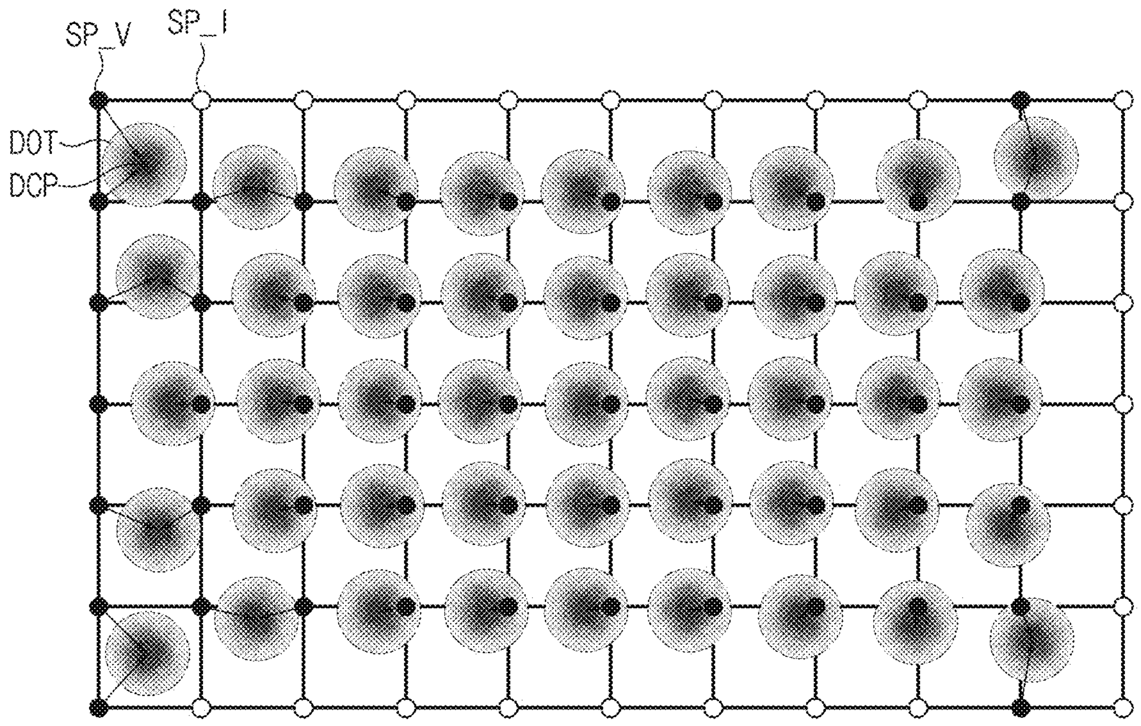
FIG. 7 is a conceptual diagram illustrating an example of an operation S30 of FIG. 5 based on some implementations of the disclosed technology.
Figure 8:
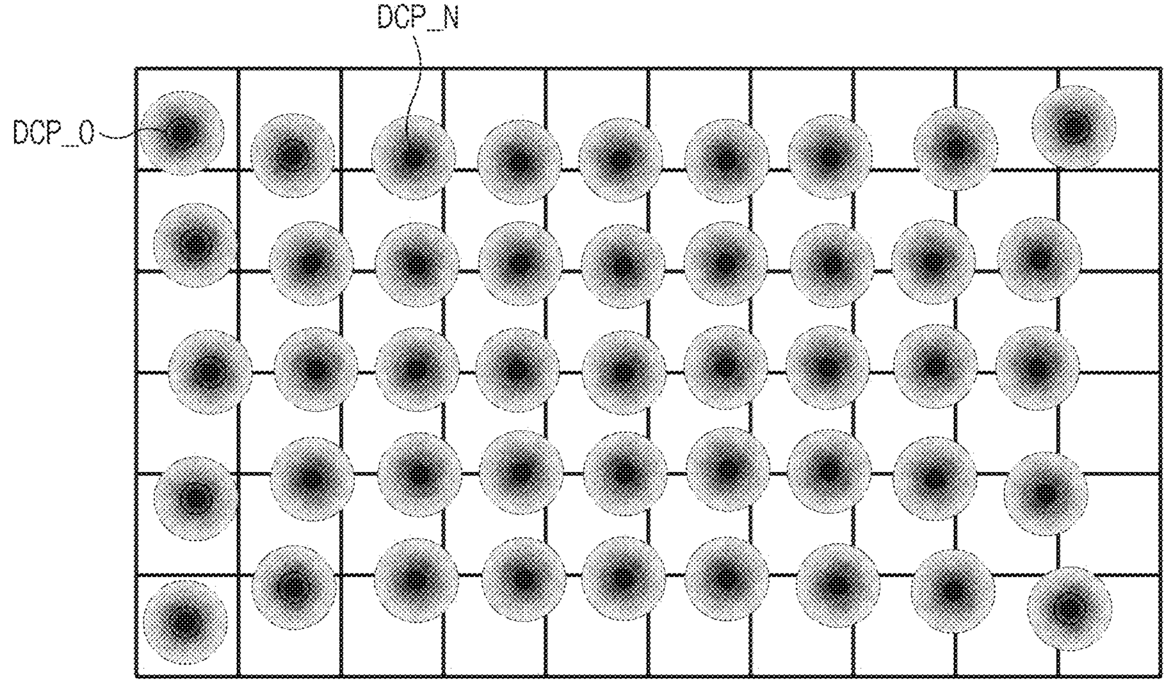
FIG. 8 is a conceptual diagram illustrating an example of an operation S50 of FIG. 5 based on some implementations of the disclosed technology.

FIG. 4 is a block diagram illustrating an example of a dot center pixel detector based on some implementations of the disclosed technology. FIG. 5 is a flowchart illustrating an example of a method for operating the dot center pixel detector, shown in FIG. 4, based on some implementations of the disclosed technology. FIG. 6 is a conceptual diagram illustrating an example of an operation S20 of FIG. 5 based on some implementations of the disclosed technology. FIG. 7 is a conceptual diagram illustrating an example of an operation S30 of FIG. 5 based on some implementations of the disclosed technology. FIG. 8 is a conceptual diagram illustrating an example of an operation S50 of FIG. 5 based on some implementations of the disclosed technology.

Referring to FIGS. 4 and 5, although the dot center pixel detector 100 may be included in the camera 3 of FIG. 1, other implementations are also possible, and it should be noted that the dot center pixel detector 100 may be located outside of the camera 3.

The dot center pixel detector 100 may receive and analyze depth data to determine a dot center pixel in the depth data and May generate and output dot center pixel information. The camera 3 may include a pixel array in which a plurality of pixels is arranged in a matrix shape including a plurality of rows and a plurality of columns to obtain depth data for a scene. Each of the plurality of pixels included in the pixel array may generate depth data for one scene, and the depth data may constitute one frame. Depth data to be input to the dot center pixel detector 100 may correspond to one frame, and depth data corresponding to one frame may be sequentially input to the dot center pixel detector 100 through a serial interface without being input simultaneously.

Since the reflection modulated light signal input to the camera 3 corresponds to dot pattern light, a region (e.g., DOT in FIG. 6) to which light is incident and a region (e.g., the remaining region other than DOT of FIG. 6) to which no light is incident may exist in one frame. Even within the region to which light is incident, the intensity of depth data at a dot center pixel located at the center of the region to which light is incident may have the highest value, and the intensity of depth data may gradually decrease toward the periphery of the dot center pixel. A signal-to-noise ratio (SNR) may be improved as the intensity of the depth data increases so that it may be most effective to calculate the distance to the scene using depth data of the dot center pixel. Accordingly, an operation of determining the dot center pixel by the dot center pixel detector 100 may be considered important in a process of detecting the distance using dot pattern light.

The dot center pixel information may include position data (location data) of the dot center pixel and depth data of the dot center pixel. In some implementations, the dot center pixel information may further include data obtained by processing depth data of the dot center pixel.

The dot center pixel detector 100 may include a search point management unit 110, a nearby pixel comparison unit 120, a valid pixel determination unit 130, and an overlapped dot center pixel removing unit 140. The dot center pixel detector 100 may be implemented in hardware, software, and/or a combination thereof.

The search point management unit 110 may acquire depth data corresponding to one frame (S10). Here, the following description will be given on the premise that the search point management unit 110 acquires depth data in units of one frame, but the scope of the disclosed technology is not limited thereto. Alternatively, the search point management unit 110 can also acquire depth data based on a unit smaller than the one frame (i.e., depth data corresponding to the storage capacity of a line memory).

FIG. 6 shows depth data corresponding to one frame, and each depth data corresponding to dot pattern light may be denoted by a dot (DOT). Brightness within the dot (DOT) may represent the intensity of depth data, and the intensity of depth data may become stronger as the brightness decreases (i.e., becomes darker). In FIG. 6, the number of dots (DOTs) and the positions of dots (DOTs), the number of search points (SPs), and the positions of search points (SPs) are merely examples for convenience of description, and the scope of the disclosed technology is not limited thereto.

When each pixel is a direct pixel, the intensity of depth data may be pixel data obtained by detecting the modulated light signal (MLS) reflected from a scene. In some other implementations, when each pixel is an indirect pixel, the intensity of depth data may be an amplitude value or a charge value that is calculated based on pixel data (i.e., first to fourth depth data C0~C3) corresponding to photocharges captured by a pixel controlled by a modulation control signal having a constant phase difference (e.g., 0 degrees, 90 degrees, 180 degrees, or 270 degrees) with respect to the modulated light signal (MLS).

The search point management unit 110 may determine or manage initial positions of search points that are arranged according to a predetermined rule with respect to depth data corresponding to one frame (S20). Here, each of the search points may mean the position of a pixel serving as a unit for searching for a dot center pixel. In some other implementations, when the search points are fixed in advance, operation S20 may be omitted.

In FIG. 6, the search points (SPs) may be arranged to correspond to the arrangement of dots (DOTs) constituting the dot pattern light. The search points (SPs) may be respectively arranged at intersection points of a grid pattern to correspond to dots arranged in a line in each of the horizontal direction and the vertical direction. In some implementations, an interval between the search points (SPs) adjacent in the horizontal direction may be set to be smaller than an interval between adjacent dots (DOTs) arranged in the horizontal direction, and an interval between the search points (SPs) adjacent in the vertical direction may be set to be smaller than an interval between adjacent dots (DOTs) arranged in the vertical direction. This is to prevent the presence of a dot center pixel (i.e., a missed pixel) that is not searched by any search point. Here, the interval between the dots (DOTs) may be experimentally determined as a minimum interval between the dots (DOTs). The arrangement format of the search points (SPs) is not limited to FIG. 6 and may be arranged in, for example, a zigzag pattern.

The search point management unit 110 may determine the number of search points (SPs) and the positions of search points (SPs) in a predetermined manner according to the arrangement format of dots constituting the dot pattern light and may store the determined number of the search points (SPs) and/or the determined positions of the search points (SPs). In some other implementations, the search point management unit 110 may dynamically adjust the pre-stored positions of the search points (SPs) and/or the pre-stored number of the search points (SPs). For example, when the number of dot center pixels included in the dot center pixel information is smaller than or equal to a predetermined ratio (e.g., 50%) compared to the total number of dots (DOTs), the search point management unit 110 may increase the number of search points (SPs) and may reduce the size of an interval between the adjacent search points (SPs).

The nearby pixel comparison unit 120 may determine a dot center pixel (DCP) for each search point (SP) based on depth data of pixels (i.e., neighboring pixels) located within a predetermined range of the corresponding search point (SP). In some implementations, the nearby pixel comparison unit 120 may calculate the intensity of depth data of the neighboring pixels and may determine the dot center pixel (DCP) by comparing the intensity of depth data of the neighboring pixels with each other. That is, the nearby pixel comparison unit 120 may determine one pixel of depth data having the greatest intensity from among pixels surrounding the search point (SP) to be the dot center pixel DCP (S30).

In FIG. 6, a set (or aggregate) of pixels located within a certain range for each search point (SP) may be defined as a kernel (KN). In some implementations, a horizontal length of the kernel (KN) may be set to be equal to or greater than an interval between horizontally adjacent search points (SPs) and less than twice this interval, and a vertical length of the kernel (KN) may be set to be equal to or greater than an interval between vertically adjacent search points (SPs) and less than twice this interval. This is merely an example, and the size of the kernel (KN) may be experimentally determined to minimize the number of times of unnecessary calculation (e.g., duplicate detection of the dot center pixel DCP) and the number of times of non-detection of the dot center pixel (DCP). In an embodiment, there may be a plurality of kernels (KN).

The valid pixel determination unit 130 may compare the intensity of depth data of each of the dot center pixels (DCPs) determined by the nearby pixel comparison unit 120 with a valid threshold value and may determine whether each dot center pixel (DCP) is a valid pixel (S40). The valid threshold value may be a predetermined fixed value in consideration of maximum and minimum values of the intensity of depth data, a signal-to-noise ratio (SNR), and the like. In another embodiment, when the number of dot center pixels (DCPs) included in the dot center pixel information is smaller than or equal to a predetermined ratio (e.g., 50%) compared to a total number of dots (DOTs), the valid pixel determination unit 130 may reduce the valid threshold value.

In still another embodiment, when the number of dot center pixels (DCPs) is smaller than or equal to a predetermined ratio (e.g., 50%) compared to a total number of dots (DOTs), the nearby pixel comparison unit 120 may enlarge a predetermined range of the corresponding search point (SP) to determine the dot center pixel (DCP) for each search point (SP), and operation S30 and operation S40 may be repeatedly performed. Accordingly, it is possible to more accurately detect the dot center pixel (DCP) while minimizing the resources to be consumed for determining the dot center pixel (DCP).

In FIGS. 6 and 7, arrows depicted to connect the determined dot center pixel (DCP) to the corresponding search point (SP) in a kernel (KN) including the respective search points (SPs) are illustrated.

If the intensity of depth data of the dot center pixel (DCP) of the search point (SP) is greater than or equal to a valid threshold value, the valid pixel determination unit 130 may determine the corresponding search point to be a valid search point (SP_V). Also, the dot center pixel (DCP) corresponding to the valid search point (SP_V) may be determined to be a valid pixel.

If the intensity of depth data of the dot center pixel (DCP) of the search point (SP) is less than a valid threshold value, the valid pixel determination unit 130 may determine the corresponding search point to be an invalid search point (SP_I). Also, the dot center pixel (DCP) corresponding to the invalid search point (SP_I) may be determined to be an invalid pixel.

The overlapped dot center pixel removing unit 140 may remove the overlapped dot center pixel from among the dot center pixels (DCPs) serving as valid pixels (S50).

In FIG. 8, an overlapped dot center pixel DCP_O (denoted by a double circle in FIG. 8) may refer to a pixel corresponding to a plurality of valid search points (SP_V). A normal dot center pixel (DCP_N) may refer to a pixel corresponding to one valid search point (SP_V). When information on dot center pixels (DCP) that are redundantly and substantially identical to overlapped dot center pixels (DCP_O) are included in the dot center pixel information, the distance to the scene may be unnecessarily calculated multiple times. Therefore, the overlapped dot center pixel removing unit 140 may select only one dot center pixel from among the overlapped dot center pixels (DCP_O).

Here, when the positions of the dot center pixels (DCP) are the same or are located within a predetermined distance (e.g., a diameter of each dot of the dot pattern light), the overlapped dot center pixel removing unit 140 may determine the corresponding dot center pixels (DCP) to be the overlapped dot center pixels (DCP_O). In some implementations, when the positions of the dot center pixels (DCP) are the same, the overlapped dot center pixel removing unit 140 may select only a dot center pixel (DCP) corresponding to a search point (SP) having the smallest or largest index (i.e., the smallest or largest identification (ID) number) of the search point (SP). In some other implementations, when the dot center pixels (DCPs) are located within a predetermined distance, the overlapped dot center pixel removing unit 140 may select only the dot center pixel (DCP) having the greatest intensity of depth data.

The dot center pixel detector 100, based on some implementations of the disclosed technology, can correctly calculate the dot center pixel despite scene-dependent characteristics or other distortions (e.g., lens distortion, variation in the relative positional relationship between the light source module 2 and the camera 3, and the like), correctly calculate the distance to the scene, and thus minimize the number of unnecessary calculations.

Figure 9:
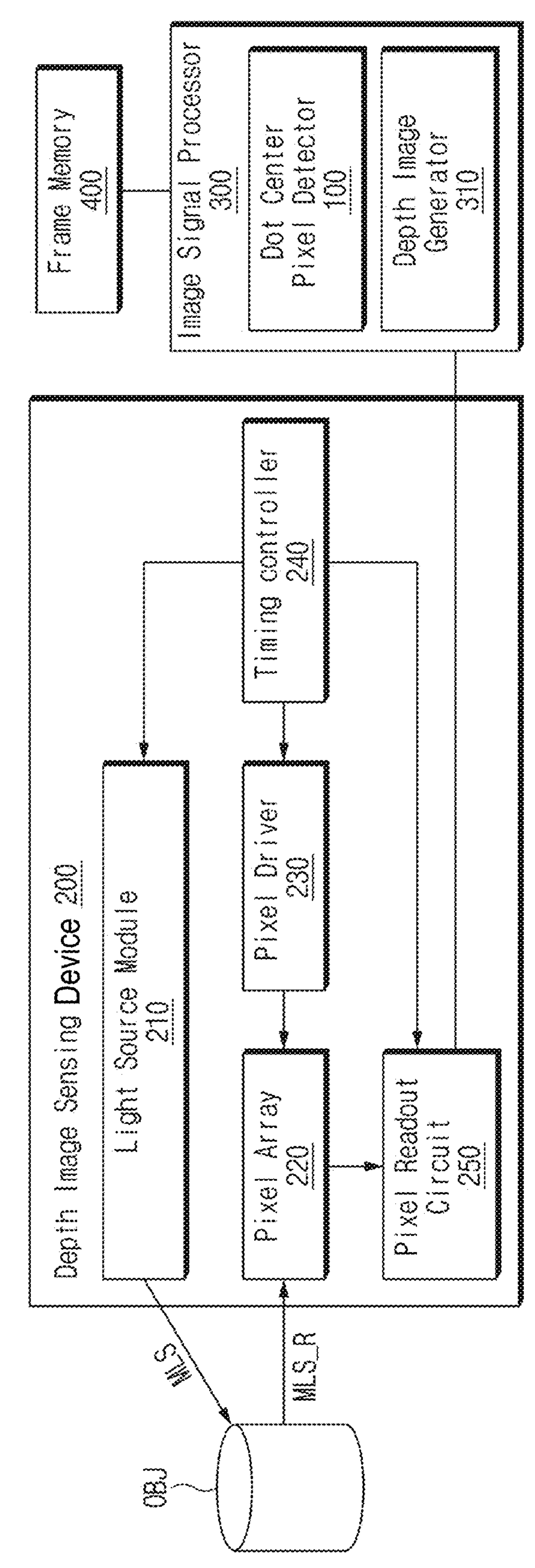
FIG. 9 is a block diagram illustrating an example of an imaging device including the dot center pixel detector shown in FIG. 4 based on some implementations of the disclosed technology.

FIG. 9 is a block diagram illustrating an example of an imaging device including the dot center pixel detector 100, shown in FIG. 4, based on some implementations of the disclosed technology.

Referring to FIG. 9, the imaging device 900 may include a depth image sensing device 200, an image signal processor 300, and a frame memory 400.

The depth image sensing device 200 may generate depth data for a target object (OBJ) by using at least one depth sensing technology. The depth image sensing device 200 may include a light source module 210, a pixel array 220, a pixel driver 230, a timing controller 240, and a pixel readout circuit 250.

A light source module 210 may emit light to a target object (OBJ) upon receiving a control signal from the timing controller 240. The light source module 210 may be a laser diode (LD) or a light emitting diode (LED) for emitting light (e.g., near infrared (NIR) light, infrared (IR) light or visible light) having a specific wavelength band or may be any one of a Near Infrared Laser (NIR), a point light source, a monochromatic light source combined with a white lamp or a monochromator, and a combination of other laser sources. For example, the light source module 210 may emit infrared light having a wavelength of 800 nm to 1000 nm. Meanwhile, the modulated light signal (MLS) may be pulsed light having predetermined modulation characteristics (e.g., a predetermined waveform, wavelength, period, amplitude, frequency, phase, duty ratio, etc.).

The pixel array 220 may include a plurality of pixels consecutively arranged in a two-dimensional (2D) matrix structure (e.g., consecutively arranged in the row and column directions). In the following embodiments of the drawings from FIG. 9, each pixel may be a direct pixel or an indirect pixel. While other implementations are also possible, the following description assumes that each pixel is an indirect pixel for convenience of description.

Each of the pixels of the pixel array 220 may photoelectrically convert the reflection modulated light signal (MLS_R) received through a lens module (not shown) upon receiving a control signal from the pixel driver 230, generate a pixel signal serving as an electrical signal corresponding to the intensity of the reflection modulated light signal (MLS_R), and output the pixel signal to the pixel readout circuit 250.

The pixel driver 230 may generate a signal for controlling each pixel of the pixel array 220 under control of the timing controller 240 and may supply the generated signal to the pixel array 220. In particular, the pixel driver 230 may generate a first modulation control signal (MCS1) and a second modulation control signal (MCS2) for controlling a timing at which each tap captures photocharges and may supply the first modulation control signal (MCS1) and the second modulation control signal (MCS2) to the pixel array 220.

The timing controller 240 may control an overall operation of the depth image sensing device 200 by controlling the light source module 210, the pixel driver 230, and the pixel readout circuit 250.

The pixel readout circuit 250 may process an analog pixel signal output from each pixel to generate depth data corresponding to the pixel signal. For example, the pixel readout circuit 250 may include an analog-to-digital (AD) converter for AD-converting the pixel signal into depth data.

The image signal processor 300 may collect depth data received from the depth image sensing device 200 to generate a depth image representing the distance to the target object (OBJ). Also, the image signal processor 300 may perform image signal processing for noise removal and image quality improvement on the generated depth image.

The depth image output from the image signal processor 300 may be stored in either the imaging device 900 or an internal or external memory of a device equipped with the imaging device 900 according to a user's request or through automation or may be displayed on a display according to a user's request or through automation. Alternatively, the depth image output from the image signal processor 300 may be used to control the operation of the imaging device 900 or the operation of the device equipped with the imaging device 900.

The image signal processor 300 may include the dot center pixel detector 100. The image signal processor 300 may store depth data received from the depth image sensing device 200 in the frame memory 400 and then may provide depth data corresponding to one frame to the dot center pixel detector 100. The dot center pixel detector 100 may generate dot center pixel information, which is information regarding a plurality of dot center pixels, with respect to depth data corresponding to one frame.

The depth image generator 310 may calculate a phase difference between the modulated light signal (MLS) and the reflection modulated light signal (MLS_R) for each of the plurality of dot center pixels with reference to the dot center pixel information, calculate a distance between the target object (OBJ) and the depth image sensing device 200 based on the calculated phase difference, and thus generate a depth image.

The frame memory 400 may receive and store depth data generated by the depth image sensing device 200 through the image signal processor 300. The frame memory 400 may have the storage capacity capable of storing depth data corresponding to one frame. In addition, the frame memory 400 may store not only data (e.g., search point information, dot center pixel information, etc.) required for the operation of the image signal processor 300, but also instructions.

The imaging device 900 may correspond to a specific implementation example of the imaging device 1, described in FIG. 1, and may be an embodiment related to a case in which the dot center pixel detector 100 is included in the image signal processor 300.

Figure 10:
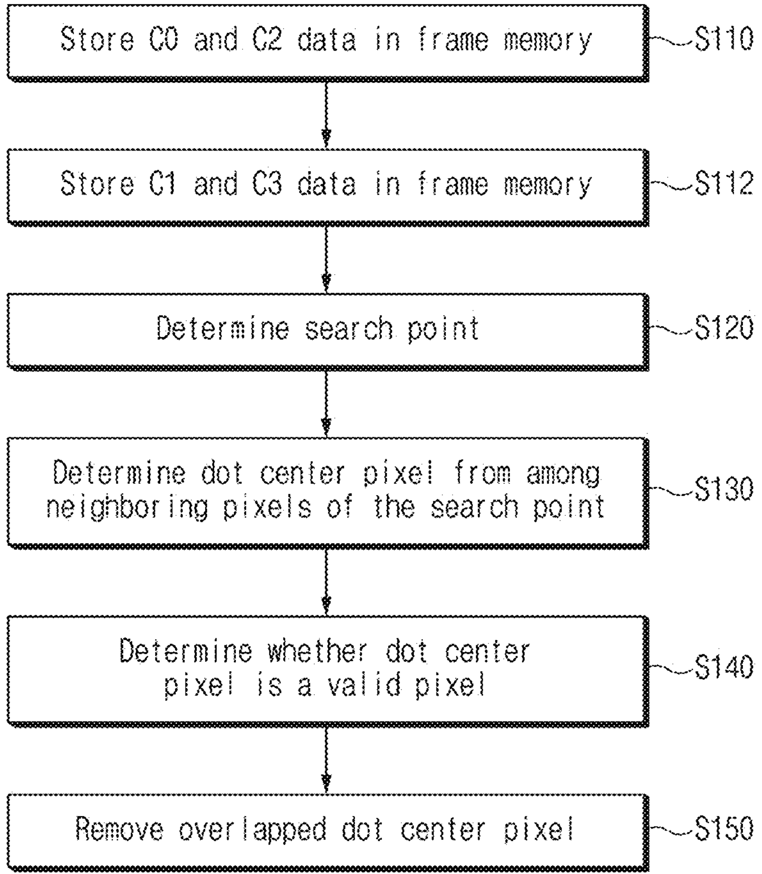
FIG. 10 is a flowchart illustrating an example of a method for operating the imaging device shown in FIG. 9 based on some implementations of the disclosed technology.

FIG. 10 is a flowchart illustrating an example of a method for operating the imaging device, shown in FIG. 9, based on some implementations of the disclosed technology.

Referring to FIG. 10, except for some operations, the method of operating the imaging device, shown in FIG. 10, is substantially the same as the method of operating the dot center pixel detector, described in FIG. 5. As such, redundant description thereof will herein be omitted, and the following description will focus on characteristic operations different from those of FIG. 5.

First, the depth image sensing device 200 may generate first depth data (C0) and third depth data (C2) in the first sensing period SP1, and the image signal processor 300 may generate the first depth data (C0) and the third depth data (C2) in the frame memory 400 (S110).

The depth image sensing device 200 may generate second depth data (C1) and fourth depth data (C3) in the second sensing period SP2, and the image signal processor 300 may store the second depth data (C1) and the fourth depth data (C3) in the frame memory 400 (S112).

The search point management unit 110 may determine or manage initial positions of search points according to a predetermined rule for the first to fourth depth data C0 to C3 corresponding to one frame (S120).

The nearby pixel comparison unit 120 may determine a dot center pixel (DCP) for each search point SP based on depth data of pixels located within a predetermined range of the corresponding search point SP (S130).

The valid pixel determination unit 130 may compare the intensity of depth data of each dot center pixel (DCP) determined by the nearby pixel comparison unit 120 with a valid threshold value to determine whether each dot center pixel (DCP) is a valid pixel (S140).

In some implementations, when the number of dot center pixels (DCPs) is smaller than or equal to a predetermined ratio (e.g., 50%) compared to the total number of dots (DOTs), the nearby pixel comparison unit 120 may enlarge a predetermined range of the corresponding search point (SP) for determining the dot center pixel (DCP) for each search point (SP), and operation S130 and operation S140 may be repeatedly performed. Accordingly, the imaging device based on some implementations of the disclosed technology can more accurately detect the dot center pixel (DCP) while minimizing resources to be consumed for determining the dot center pixel (DCP).

The overlapped dot center pixel removing unit 140 may remove the overlapped dot center pixel from among the dot center pixels (DCPs) serving as valid pixels (S150).

Figure 11:
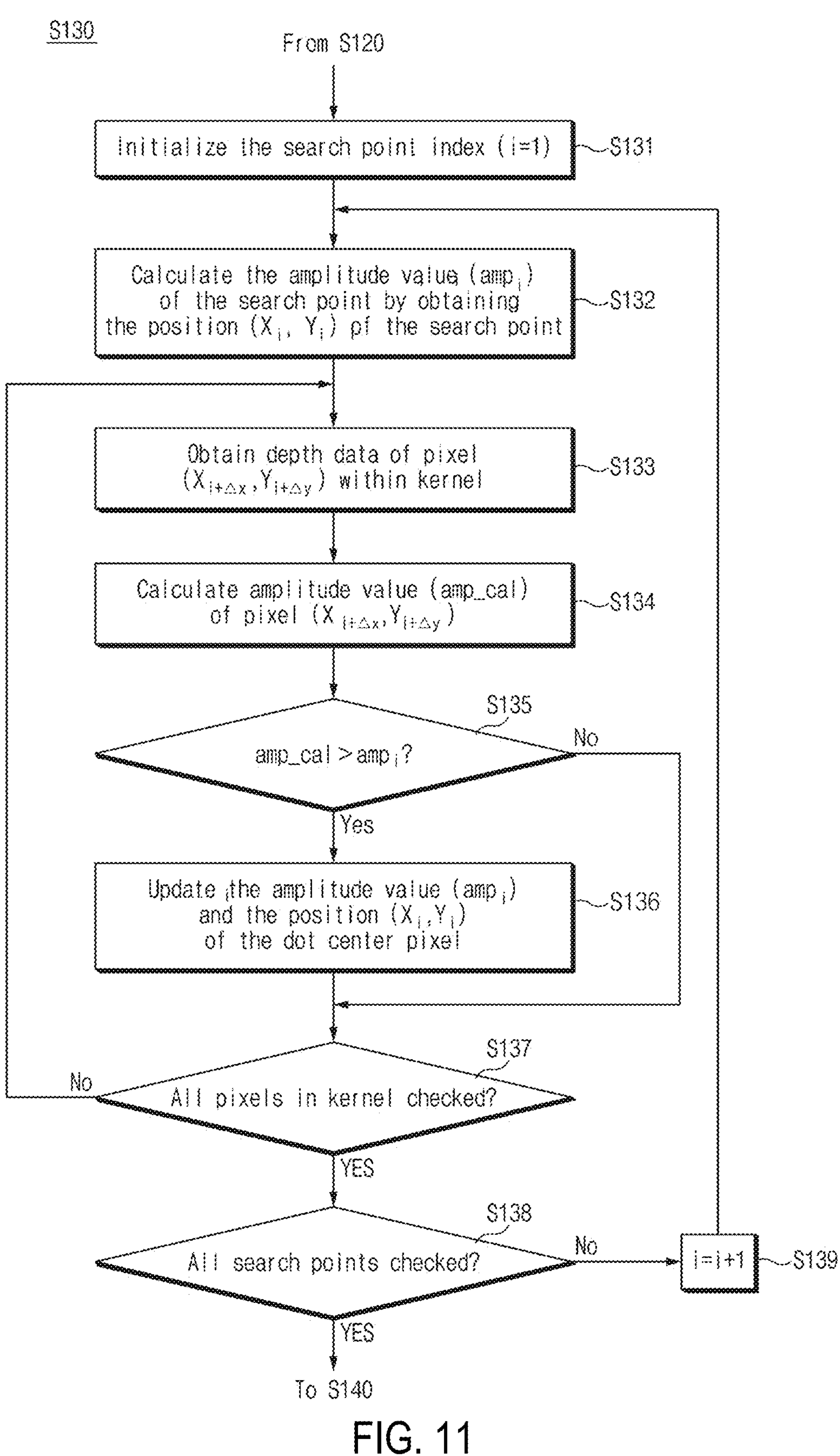
FIG. 11 is a flowchart illustrating an example of an operation S130 shown in FIG. 10 based on some implementations of the disclosed technology.

FIG. 11 is a flowchart illustrating an example of an operation S130, shown in FIG. 10, based on some implementations of the disclosed technology.

Referring to FIG. 11, the nearby pixel comparison unit 120 may initialize (i.e., i=1) the search point index (i) serving as identification (ID) information of the search point SP (S131). The plurality of search points (SPs), shown in FIG. 6, may have different search point indices. For example, as can be seen from FIG. 6, a search point index of the leftmost search point SP of the first line may be set to '1' and may sequentially increase by 1 as it moves to the right end of the first line. A search point index of the leftmost search point SP of the second line may be set to '12' and may sequentially increase by 1 as it moves to the right end of the second line. In this way, it is assumed that the search point indices for a total of 77 search points (SPs) are given.

The nearby pixel comparison unit 120 may obtain the position ($X_i$, $Y_i$) of the search point SP corresponding to the current search point index and may calculate the amplitude value ($amp_i$) of the search point SP (S132). Calculation of the amplitude value ($amp_i$) may be performed through Equation 3 using the first to fourth depth data (C0~C3) for the search point SP. Also, the nearby pixel comparison unit 120 may update the position ($X_i$, $Y_i$) to the position of the dot center pixel and may update the amplitude value ($amp_i$) of the search point SP to the amplitude value of the dot center pixel.

The nearby pixel comparison unit 120 may obtain first to fourth depth data (C0~C3) of an arbitrary pixel ($X_{i+\Delta x}$, $Y_{i+\Delta y}$) within the kernel (KN) including the search point SP (S133).

The nearby pixel comparison unit 120 may determine an amplitude value (amp_cal) of the pixel ($X_{i+\Delta x}$, $Y_{i+\Delta y}$) using the first to fourth depth data (C0~C3) of the pixel ($X_{i+\Delta x}$, $Y_{i+\Delta y}$) (S134).

When the calculated amplitude value (amp_cal) is greater than the amplitude value ($amp_i$) of the dot center pixel (Yes in S135), the nearby pixel comparison unit 120 may update the position of the pixel ($X_{i+\Delta x}$, $Y_{i+\Delta y}$) to the position ($X_i$, $Y_i$) of the dot center pixel while updating the calculated amplitude value (amp_cal) of the pixel ($X_{i+\Delta x}$, $Y_{i+\Delta y}$) to the amplitude value ($amp_i$) of the dot center pixel, respectively (S136).

When the calculated amplitude value (amp_cal) is less than or equal to the amplitude value ($amp_i$) of the dot center pixel (No in S135), the position ($X_i$, $Y_i$) and the amplitude value ($amp_i$) of the dot center pixel can be maintained without executing operation S136.

The nearby pixel comparison unit 120 may determine whether operation S133 has been performed on all pixels included in the kernel (KN) having the search point SP (S137).

If operation S133 is not performed on all pixels in the kernel KN (No in S137), operation S133 may be performed on other pixels in the kernel KN except for pixels ($X_{i+\Delta x}$, $Y_{i+\Delta y}$) on which operation S133 have been performed. Thereafter, operations S133 to S137 may be repeatedly performed on all pixels in the kernel KN, and when operations S133 to S137 are performed on all pixels in the kernel KN, a pixel having the highest amplitude value ($amp_i$) in the kernel KN may be determined to be a dot center pixel, and the position ($X_i$, $Y_i$) and the amplitude value ($amp_i$) of the corresponding dot center pixel may be stored in the frame memory 400. In an embodiment, a pixel having the highest amplitude value ($amp_i$) may be determined in a plurality of kernels (KN), for example, in each of the plurality of kernels (KN).

When operation S133 has been performed on all pixels in the kernel KN (Yes in S137) and operation S132 has not been performed on all search points (No in S138), the nearby pixel comparison unit 120 may increase the current search point index (i) by 1 (S139), and the operation process may return to operation S132. The above operations may be repeated until operation S132 is performed for all search points, and if operation S132 is performed on all search points (Yes in S138), the position ($X_i$, $Y_i$) and the amplitude value ($amp_i$) of the dot center pixel for each of all search points may be stored in the frame memory 400.

Figure 12:
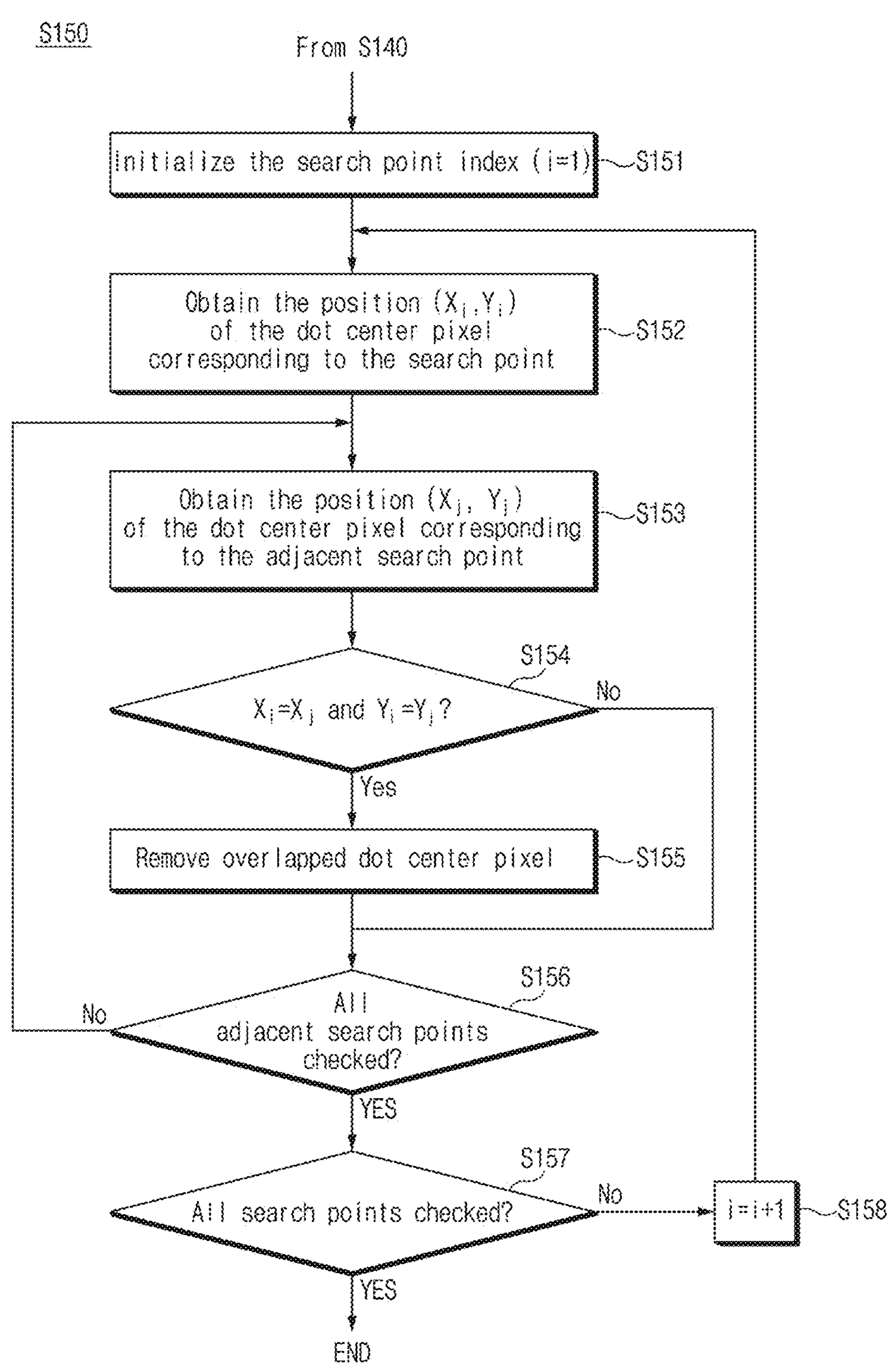
FIG. 12 is a flowchart illustrating an example of an operation S150 shown in FIG. 10 based on some implementations of the disclosed technology.

FIG. 12 is a flowchart illustrating an example of operation S150 shown in FIG. 10 based on some implementations of the disclosed technology.

Referring to FIG. 12, the overlapped dot center pixel removing unit 140 may initialize (i.e., i=1) the search point index (i) serving as identification (ID) information of the search point SP (S151). Here, it should be noted that each operation of FIG. 12 can be performed only for the valid search point (SP_V) determined in operation S140, and the search point SP described in FIG. 12 is a valid search point (SP_V).

The overlapped dot center pixel removing unit 140 may obtain the positions ($X_i$, $Y_i$) of the dot center pixel corresponding to the search point SP corresponding to the current search point index (S152).

The overlapped dot center pixel removing unit 140 may obtain the position ($X_j$, $Y_j$) of each dot center pixel corresponding to adjacent search points, adjacent to the search point SP corresponding to the current search point index (S153). Here, the adjacent search point may be a search point that is located to be adjacent in up, down, left, and right directions or in a diagonal direction with respect to the search point SP corresponding to the current search point index and may refer to a search point at which the search point SP corresponding to the current search point index and the kernel (KN) overlap with each other.

The overlapped dot center pixel removing unit 140 may compare the position ($X_i$, $Y_i$) of the dot center pixel corresponding to the search point SP corresponding to the current search point index with the position ($X_j$, $Y_j$) of the dot center pixel corresponding to an adjacent search point and may determine whether or not two positions are identical to each other based on the result of the comparison (S154).

If the position ($X_i$, $Y_i$) of the dot center pixel position and the position ($X_j$, $Y_j$) of the dot center pixel are identical to each other (Yes in S154), the dot center pixels may overlap with each other. When the dot center pixels overlap with each other, the overlapped dot center pixel removing unit 140 may remove one of the overlapped dot center pixels (S155). In some implementations, the overlapped dot center pixel removing unit 140 may select only dot center pixels (DCPs) corresponding to a search point having a relatively smaller or relatively larger index.

If the position ($X_i$, $Y_i$) of the dot center pixel position and the position ($X_j$, $Y_j$) of the dot center pixel are different from each other (No in S154), the dot center pixels might not overlap with each other, and therefore, operation S155 might not be performed.

The overlapped dot center pixel removing unit 140 may determine whether operation S153 has been performed on all search points adjacent to the search point SP (S156).

If operation S153 is not performed on all search points adjacent to the search point SP (No in operation S156), operation S153 may be performed on other search points adjacent to the search point SP. Thereafter, operations S153 to S156 may be repeatedly performed on other search points adjacent to the search point SP. When operations S153 to S156 are performed on all search points adjacent to the search point SP, the overlapped dot center pixel removing unit 140 may remove the overlapped dot center pixels one by one in relation to the search point SP.

When operation S153 has been performed on all search points adjacent to the search point SP (Yes in S156) and operation S152 has not been performed on all search points (SPs) (No in S157), the overlapped dot center pixel removing unit 140 may increase the current search point index (i) by 1 (S158) and may return to operation S152. These operations may be repeated until operation S152 is performed on all search points. Then, if operation S152 is performed on all search points (Yes in S157), dot center pixel information for all dot center pixels may be stored in the frame memory 400 to prevent the positions ($X_i$, $Y_i$) and the amplitude values ($amp_i$) of the dot center pixels from overlapping with each other.

As described above with reference to FIGS. 9 to 12, when the dot center pixel is determined by using the amplitude value as the intensity of depth data, only the active components (actual signal components) excluding the ambient light component can be used to more accurately determine the dot center pixel.

Figure 13:
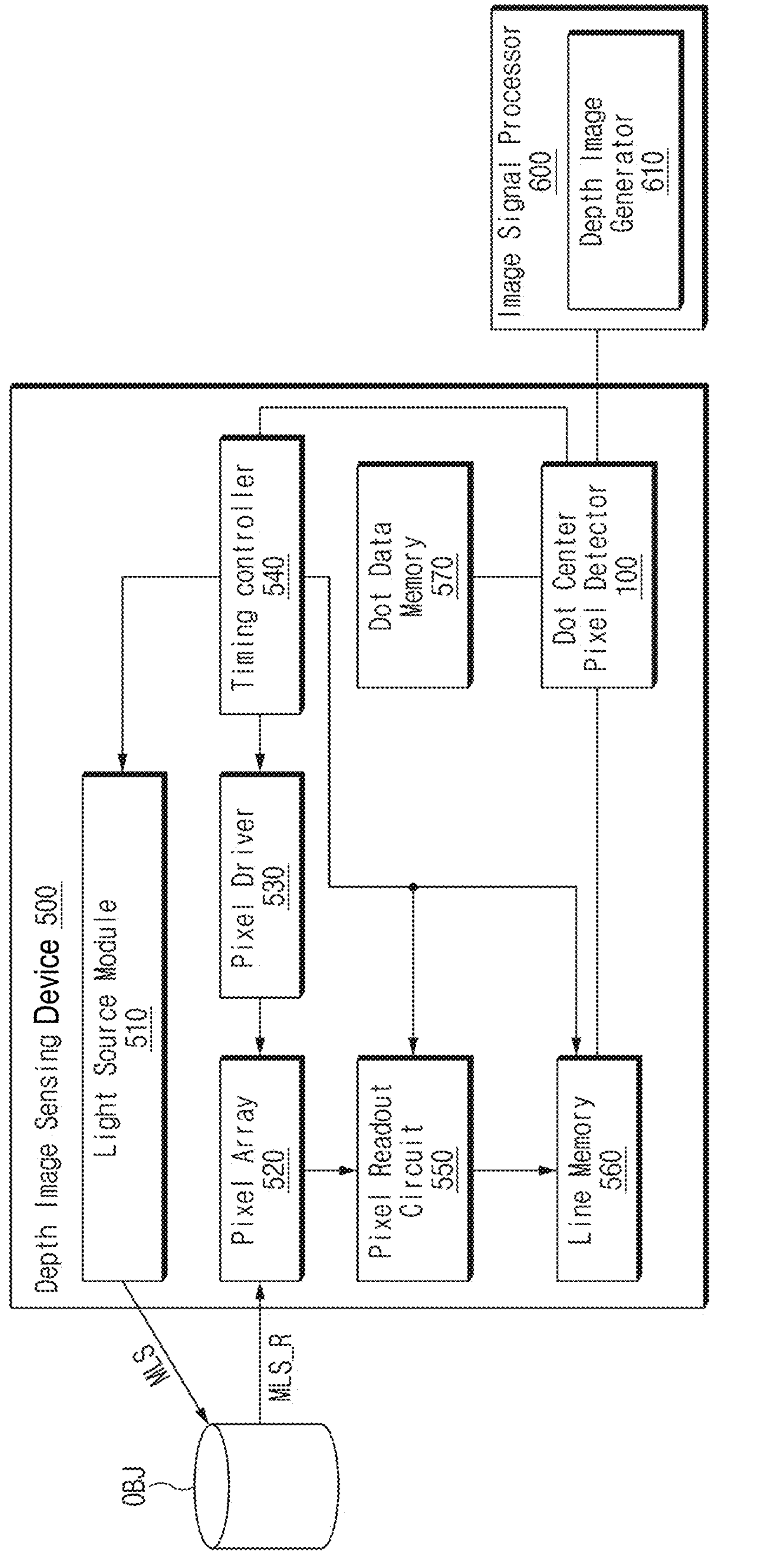
FIG. 13 is a block diagram illustrating another example of the imaging device including the dot center pixel detector shown in FIG. 4 based on some implementations of the disclosed technology.

FIG. 13 is a block diagram illustrating another example of the imaging device 1300 including the dot center pixel detector, shown in FIG. 4, based on some implementations of the disclosed technology.

Referring to FIG. 13, the imaging device 1300 may include a depth image sensing device 500 and an image signal processor 600.

The imaging device 1300 might not include a frame memory for the operation of the dot center pixel detector 100. The dot center pixel detector 100 may be included in the depth image sensing device 500 instead of the image signal processor 600. In addition, a line memory 560 and a dot data memory 570 for the operation of the dot center pixel detector 100 may be included in the depth image sensing device 500.

The depth image sensing device 500 may include a light source module 510, a pixel array 520, a pixel driver 530, a timing controller 540, a pixel readout circuit 550, a line memory 560, a dot data memory 570, and a dot center pixel detector 100. The light source module 510, the pixel array 520, the pixel driver 530, the timing controller 540, and the pixel readout circuit 550, shown in FIG. 13, may be identical in function and operation to the light source module 510, the pixel array 520, the pixel driver 530, the timing controller 540, and the pixel readout circuit 550, shown in FIG. 9. Therefore, redundant description thereof will herein be omitted for the sake of brevity.

The line memory 560 may store depth data output from the pixel readout circuit 250. The line memory 560 may have the storage capacity capable of storing depth data corresponding to a portion of one frame. Here, a portion of one frame may correspond to pixels included in a plurality of rows of the pixel array 520, and the number of such rows may be determined to be the same number as the number of intervals between search points (SPs) vertically adjacent to each other or may be determined to be a higher number than the number of intervals between the vertically adjacent search points (SPs), but the scope or spirit of the disclosed technology is not limited thereto.

The dot data memory 570 may store not only data required for the operation of the dot center pixel detector 100 (e.g., search point information, dot center pixel information, etc.), but also instructions.

Since the dot center pixel detector 100 is included in the depth image sensing device 500, the line memory 560 and the dot data memory 570 mounted in the depth image sensing device 500 can be implemented with a minimum capacity, thereby minimizing the required memory capacity.

The dot center pixel detector 100 may generate dot center pixel information by using only internal resources of the depth image sensing device 500. The depth image generator 610 of the image signal processor 600 may calculate a phase difference between the modulated light signal (MLS) and the reflection modulated light signal (MLS_R) for each of the plurality of dot center pixels by referring to dot center pixel information received from the depth image sensing device 500. Then, the depth image generator 610 may calculate the distance between the target object (OBJ) and the depth image sensing device 200 based on the calculated phase difference and may thus generate a depth image.

Figure 14:
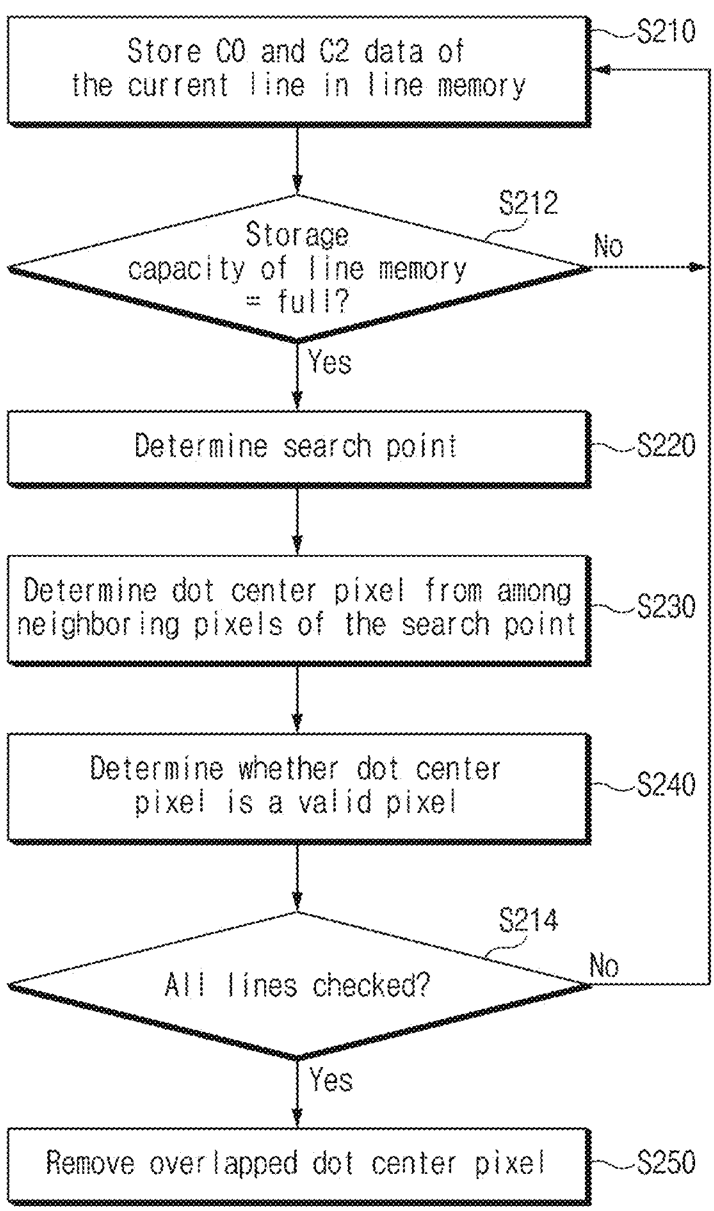
FIG. 14 is a flowchart illustrating an example of a method for operating the imaging device shown in FIG. 13 based on some implementations of the disclosed technology.
Figure 15:
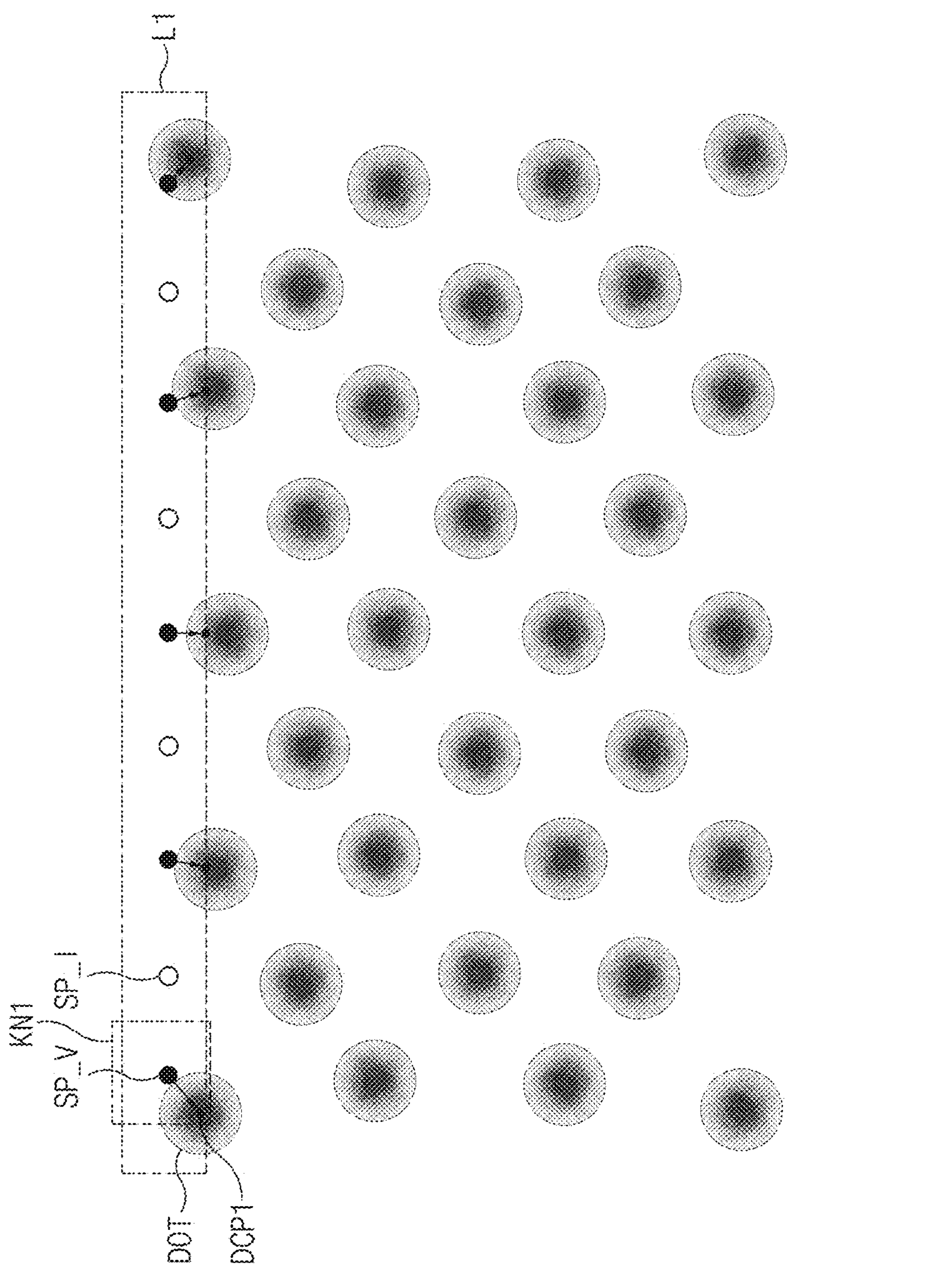
FIG. 15 is a conceptual diagram illustrating an example of an operation performed on a first line group based on some implementations of the disclosed technology.
Figure 16:
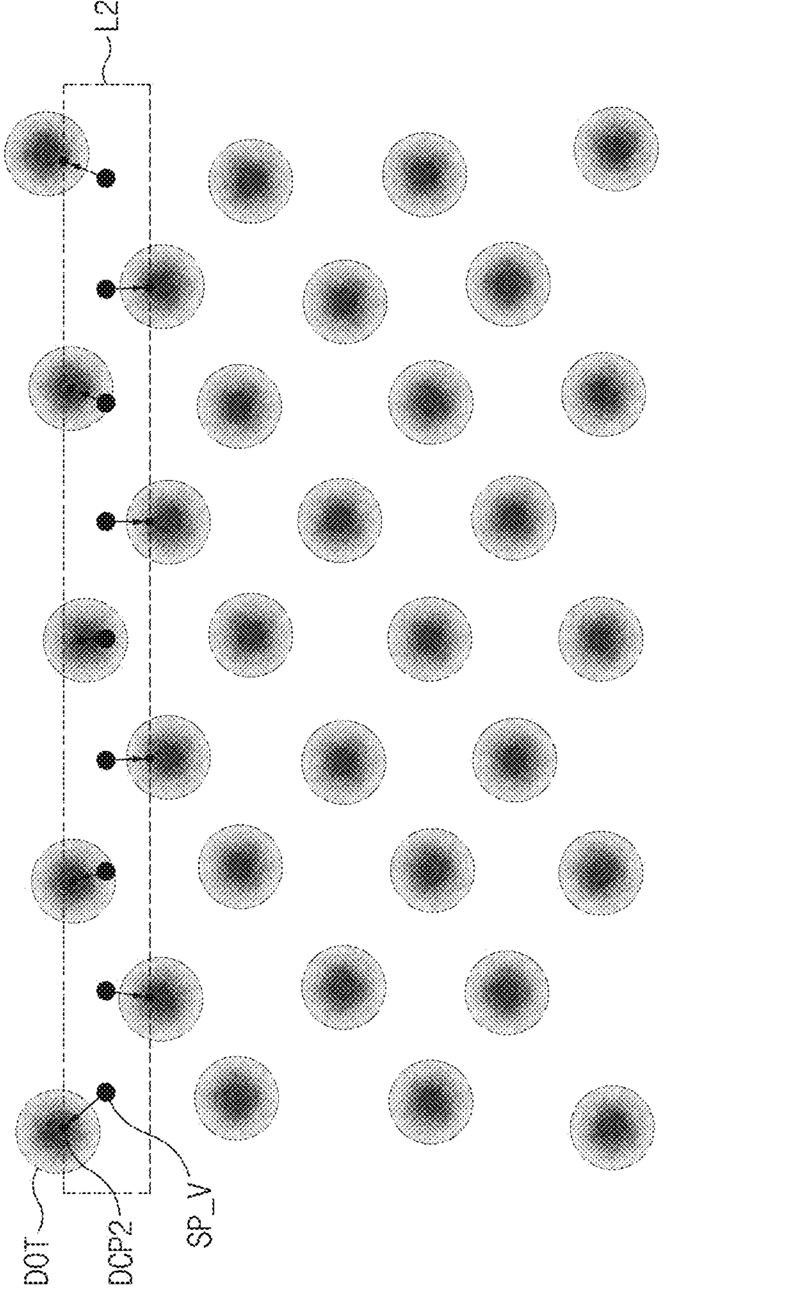
FIG. 16 is a conceptual diagram illustrating an example of an operation performed on a second line group based on some implementations of the disclosed technology.
Figure 17:
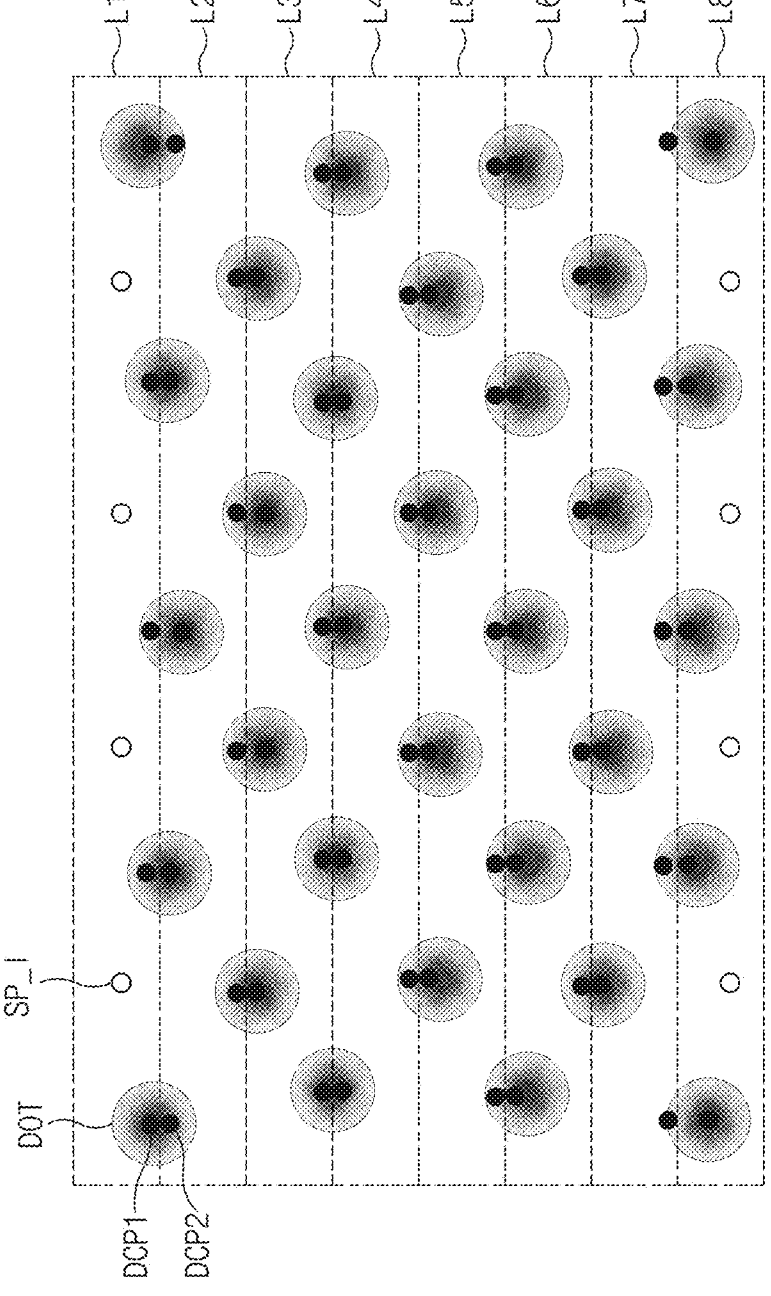
FIGS. 17 and 18 are conceptual diagrams illustrating examples of an operation S250 shown in FIG. 14 based on some implementations of the disclosed technology.
Figure 18:
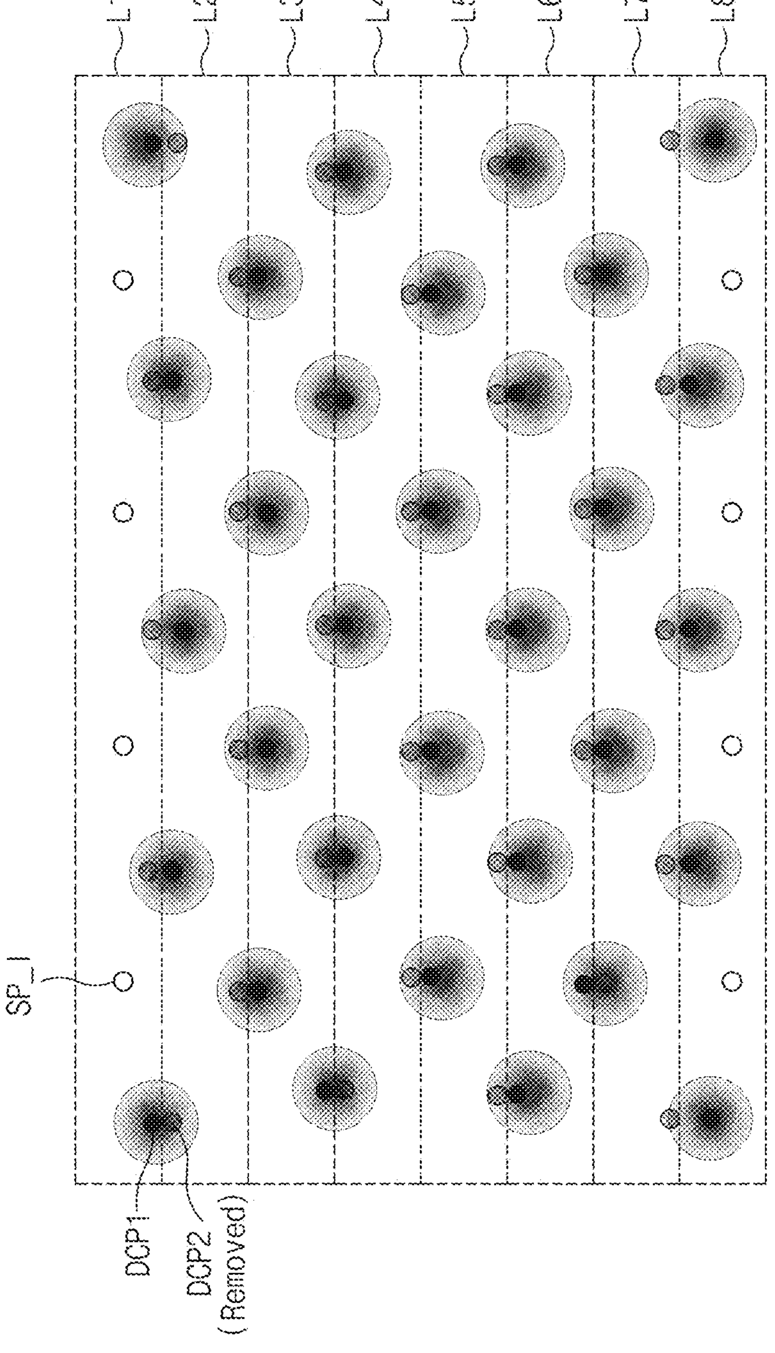

FIG. 14 is a flowchart illustrating an example of a method for operating the imaging device, shown in FIG. 13, based on some implementations of the disclosed technology. FIG. 15 is a conceptual diagram illustrating an example of an operation performed on a first line group based on some implementations of the disclosed technology. FIG. 16 is a conceptual diagram illustrating an example of an operation performed on a second line group based on some implementations of the disclosed technology. FIGS. 17 and 18 are conceptual diagrams illustrating examples of an operation S250, shown in FIG. 14, based on some implementations of the disclosed technology.

Referring to FIG. 14, the method of operating the imaging device, shown in FIG. 14, except for some operations is substantially the same as the method of operating the dot center pixel detector described in FIG. 5, as such redundant description thereof will herein be omitted, and the following description will be given centering upon characteristic operations different from those of FIG. 5.

First, the depth image sensing device 500 may generate first depth data C0 and third depth data C2 in the first sensing period SP1 and may store the first depth data C0 and the third depth data C2 of a current line (i.e., row) of the pixel array 520 in the line memory 560 (S210).

When the capacity of the line memory 560 is not full (No in S212), the depth image sensing device 500 may repeatedly perform operation S210.

When the capacity of the line memory 560 is full (Yes in S212), the search point management unit 110 may determine or manage search points that are arranged according to a predetermined rule with respect to the first and third depth data (C0, C2) corresponding to a line group composed of lines stored in the line memory 560 (S220).

The nearby pixel comparison unit 120 may determine a dot center pixel (DCP) for each search point (SP) based on depth data of pixels located within a predetermined range of the corresponding search point SP (S230).

The valid pixel determination unit 130 may compare the intensity of depth data of each of the dot center pixels (DCPs) determined by the nearby pixel comparison unit 120 with a valid threshold value to determine whether each dot center pixel (DCP) is a valid pixel (S240).

In FIG. 15, the nearby pixel comparison unit 120 may determine a dot center pixel (DCP1) of a dot based on depth data of pixels located in a kernel (KN1) corresponding to each search point included in a first line group (L1) stored in the line memory 560.

Also, the valid pixel determination unit 130 may compare the intensity of depth data of each dot center pixel (DCP1) determined by the nearby pixel comparison unit 120 with a valid threshold value and may determine whether each dot center pixel (DCP1) is a valid pixel based on the result of comparison. When the dot center pixel DCP1 is a valid pixel, a search point corresponding to the corresponding dot center pixel DCP1 may be determined to be a valid search point (SP_V). In addition, when the dot center pixel DCP1 is not a valid pixel, a search point corresponding to the corresponding dot center pixel DCP1 may be determined to be an invalid search point (SP_I).

When operation S240 is completed, the dot center pixel detector 100 may determine whether the detection operation of the dot center pixel has been completed for all lines of the pixel array 520 (S214).

When the dot center pixel detection operation is not completed for all lines of the pixel array 520 (No in S214), the dot center pixel detector 100 may request that the timing controller read out information regarding the next line group and may store the read information. The timing controller 540 may control the pixel driver 530, the pixel readout circuit 550, and the line memory 560 to perform operation S210 for the next line group. Accordingly, operations S210 to S240 may be performed on the second line group L2 serving as the next line group.

In FIG. 16, the nearby pixel comparison unit 120 may determine a dot center pixel (DCP2) of a dot based on depth data of pixels located in a kernel (KN2) corresponding to each search point included in the second line group (L2) stored in the line memory 560.

Also, the valid pixel determination unit 130 may compare the intensity of depth data of each dot center pixel (DCP2) determined by the nearby pixel comparison unit 120 with a valid threshold value and may determine whether each dot center pixel (DCP2) is a valid pixel based on the result of comparison. When the dot center pixel DCP2 is a valid pixel, a search point corresponding to the corresponding dot center pixel (DCP2) may be determined to be a valid search point (SP_V). In addition, when the dot center pixel DCP2 is not a valid pixel, a search point corresponding to the dot center pixel (DCP2) may be determined to be an invalid search point (SP_I).

When the detection operation of the dot center pixel is completed for all lines of the pixel array 520 (Yes in S214), the overlapped dot center pixel removing unit 140 may remove the overlapped dot center pixel from among the dot center pixels serving as valid pixels (S250).

In FIG. 17, it is assumed that the number of line groups (L1~L8) corresponding to the pixel array 520 is set to 8 for convenience of description, but the scope of the disclosed technology is not limited thereto. Each of the dot center pixels (DCP1, DCP2) may correspond to each dot (DOT), and the positions of the dot center pixels (DCP1, DCP2) may be different from each other. This is because the kernel size of each search point might not be sufficiently secured due to the limited capacity of the line memory 560.

In FIG. 18, the overlapped dot center pixel removing unit 140 may remove the overlapped dot center pixel DCP2 from among the dot center pixels (DCP1, DCP2) serving as valid pixels. Here, the overlapped dot center pixel removing unit 140 may remove the dot center pixel DCP2 having a relatively low intensity of depth data from among the dot center pixels (DCP1, DCP2).

Figure 19:
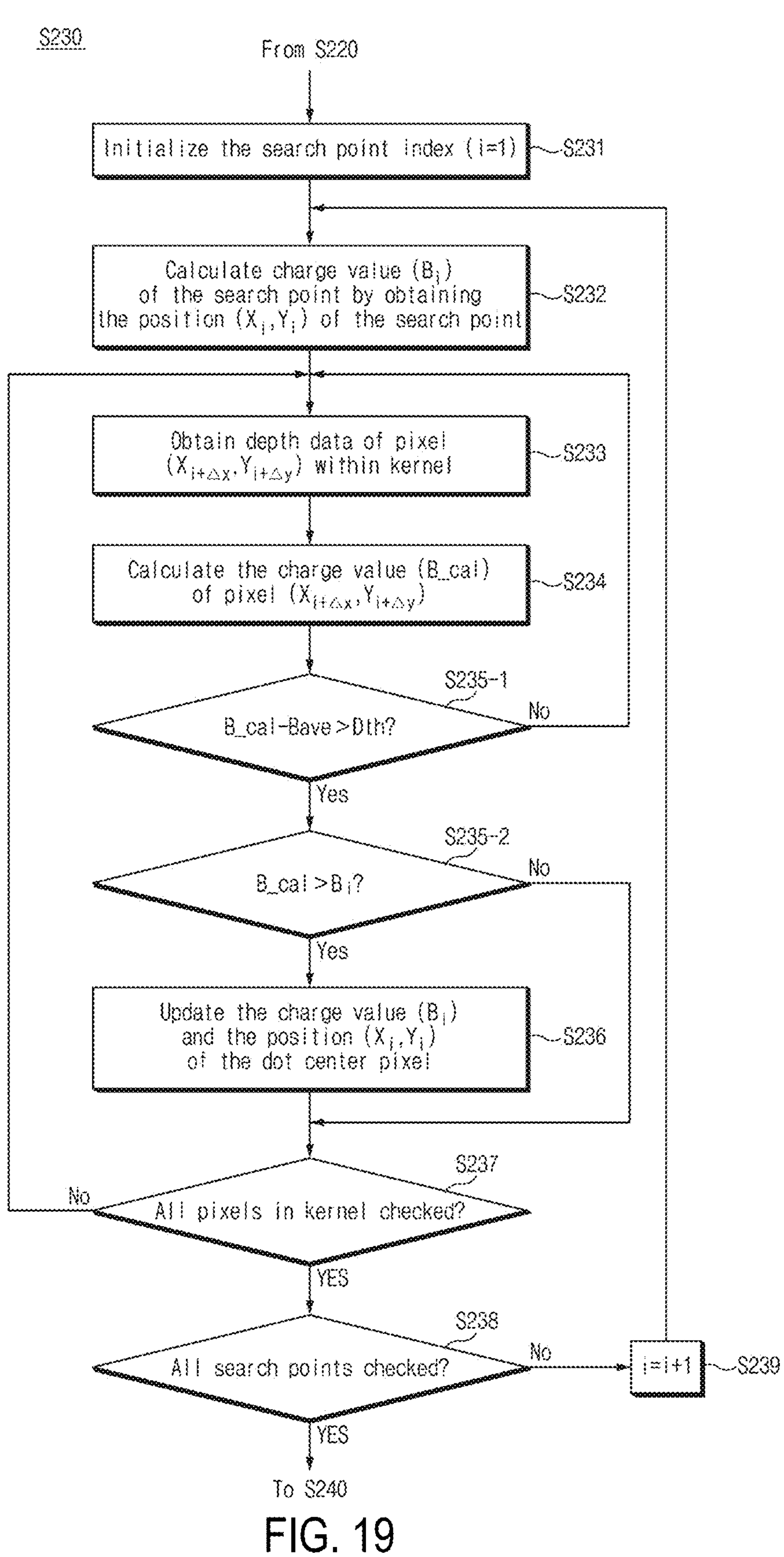
FIG. 19 is a flowchart illustrating an example of an operation S230 shown in FIG. 14 based on some implementations of the disclosed technology.

FIG. 19 is a flowchart illustrating an example of an operation S230 shown in FIG. 14 based on some implementations of the disclosed technology.

Referring to FIG. 19, the nearby pixel comparison unit 120 may initialize (i.e., i=1) the search point index (i) serving as identification (ID) information of the search point SP (S231).

The nearby pixel comparison unit 120 may obtain the position ($X_i$, $Y_i$) of the search point SP corresponding to the current search point index and may calculate a charge value (Bi) of the search point SP (S232). The charge value (Bi) may be calculated as the sum (C0+C2) of the first depth data C0 and the third depth data C2 for the search point SP. Also, the nearby pixel comparison unit 120 may update the position ($X_i$, $Y_i$) of the search point SP to the position of the dot center pixel and may update the charge value ($B_i$) of the search point SP to the charge value of the dot center pixel.

The nearby pixel comparison unit 120 may obtain first depth data C0 and third depth data C2 of an arbitrary pixel ($X_{i+\Delta x}$, $Y_{i+\Delta y}$) in the kernel having the search point SP (S233).

The nearby pixel comparison unit 120 may calculate a charge value (B_cal) of the pixel ($X_{i+\Delta x}$, $Y_{i+\Delta y}$) using the first depth data C0 and the third depth data C2 of the pixel ($X_{i+\Delta x}$, $Y_{i+\Delta y}$) (S234).

If a value obtained by subtracting an average charge value ($B_{ave}$) for the search point SP from the calculated charge value (B_cal) is greater than a threshold difference ($D_{th}$) (Yes in S235-1), the nearby pixel comparison unit 120 may regard the calculated charge value (B_cal) as a valid charge value and may compare the calculated charge value (B_cal) with the charge value ($B_i$) of the dot center pixel (S235-2).

If the value obtained by subtracting the average charge value ($B_{ave}$) for the search point SP from the calculated charge value (B_cal) is less than or equal to the threshold difference ($D_{th}$) (No in S235-1), the nearby pixel comparison unit 120 may regard the calculated charge value (B_cal) as an invalid charge value and may return to operation S233.

Here, the average charge value ($B_{ave}$) may refer to an average value of the charge values ($B_i$) of pixels (i.e., the neighboring pixels) located within a predetermined range from the search point SP, and the threshold difference ($D_{th}$) may be experimentally predetermined values. Since the charge value ($B_i$) includes the components of the reflection modulated light signal (MLS_R) as well as the components of the ambient light, the charge value ($B_i$) might not be used as a reference value, and the calculated charge value (B_cal) may be considered to be a valid value only when a difference between the calculated charge value (B_cal) and the average charge value (Bave) is greater than a predetermined threshold difference ($D_{th}$), so that only the components caused by the dot light, rather than the components caused by the ambient light, can be updated to the dot center pixel.

If the calculated charge value (B_cal) is greater than the charge value ($B_i$) of the dot center pixel (Yes in S235-2), the nearby pixel comparison unit 120 may update the position of the pixel ($X_{i+\Delta x}$, $Y_{i+\Delta y}$) and the calculated charge value (B_cal) to the position ($X_i$, $Y_i$) of the dot center pixel and the charge value ($B_i$) of the dot center pixel, respectively (S236).

If the calculated charge value (B_cal) is less than or equal to the charge value ($B_i$) of the dot center pixel (No in S235-2), the position ($X_i$, $Y_i$) and the charge value ($B_i$) of the dot center pixel can be maintained without executing operation S236.

The nearby pixel comparison unit 120 may determine whether operation S233 has been performed on all pixels in a kernel including the search point SP (S237).

If operation S233 is not performed on all pixels in the kernel (No in S237), operation S233 can be performed on other pixels in the kernel other than arbitrary pixels ($X_{i+\Delta x}$, $Y_{i+\Delta y}$) in which operation S233 has been performed. Thereafter, operations S233 to S237 may be repeatedly performed on all pixels in the kernel. When operations S233 to S237 are performed on all pixels in the kernel, a pixel having the highest charge value ($B_i$) in the kernel may be determined to be the dot center pixel, and the position ($X_i$, $Y_i$) and the charge value ($B_i$) of the corresponding dot center pixel may be stored in the dot data memory 570.

If operation S233 has been performed on all pixels in the kernel (Yes in S237) and operation S232 has not been performed on all search points (No in S238), the nearby pixel comparison unit 120 may increase the current search point index (i) by 1 (S239) and may return to operation S232. These operations may be repeated until operation S232 is performed on all search points. If operation S232 is performed on all search points (Yes in S238), the position ($X_i$, $Y_i$) and the charge value ($B_i$) of the dot center pixel for each of all search points may be stored in the dot data memory 570.

Although FIG. 19 shows the embodiment in which necessary information is stored in the dot data memory 570 using the charge value ($B_i$) in a situation in which the line memory 560 is used instead of the frame memory 400. However, other implementations are also possible, and it should be noted that necessary information can also be stored in the dot data memory 570 by using the amplitude value (amp) in a situation in which the line memory 560 is used. That is, instead of controlling all the pixels of the pixel array 520 with only the first modulation control signal MCS1 and the second modulation control signal MCS2, for example, each of the odd-numbered pixels from among pixels belonging to one row may receive a first modulation control signal MCS1 having a phase difference of 0 degrees (i.e., in-phase) with respect to the modulated light signal (MLS) and a second modulation control signal MCS2 having a phase difference of 180 degrees with respect to the modulated light signal (MLS), and each of even-numbered pixels from among pixels belonging to one row may receive a first modulation control signal MCS1 having a phase difference of 90 degrees with respect to the modulated light signal (MLS) and a second modulation control signal MCS2 having a phase difference of 270 degrees with respect to the modulated light signal (MLS). According to this control method (pseudo-4TAP), the first to fourth depth data (C0~C4) may be stored in the line memory 560, and thus, the position ($X_i$, $Y_i$) and the amplitude value ($amp_i$) of the dot center pixel may be stored in the dot data memory 570. In this case, the first to fourth depth data (C0~C4) may be configured to correspond to two pixels, rather than one pixel. This configuration may be disadvantageous in terms of resolution but may be advantageous in that the line memory 560 can be used instead of the frame memory 400. Meanwhile, a process of generating the position ($X_i$, $Y_i$) of the dot center pixel and the amplitude value ($amp_i$) of the dot center pixel may be substantially the same as the method described in FIG. 11.

Figure 20:
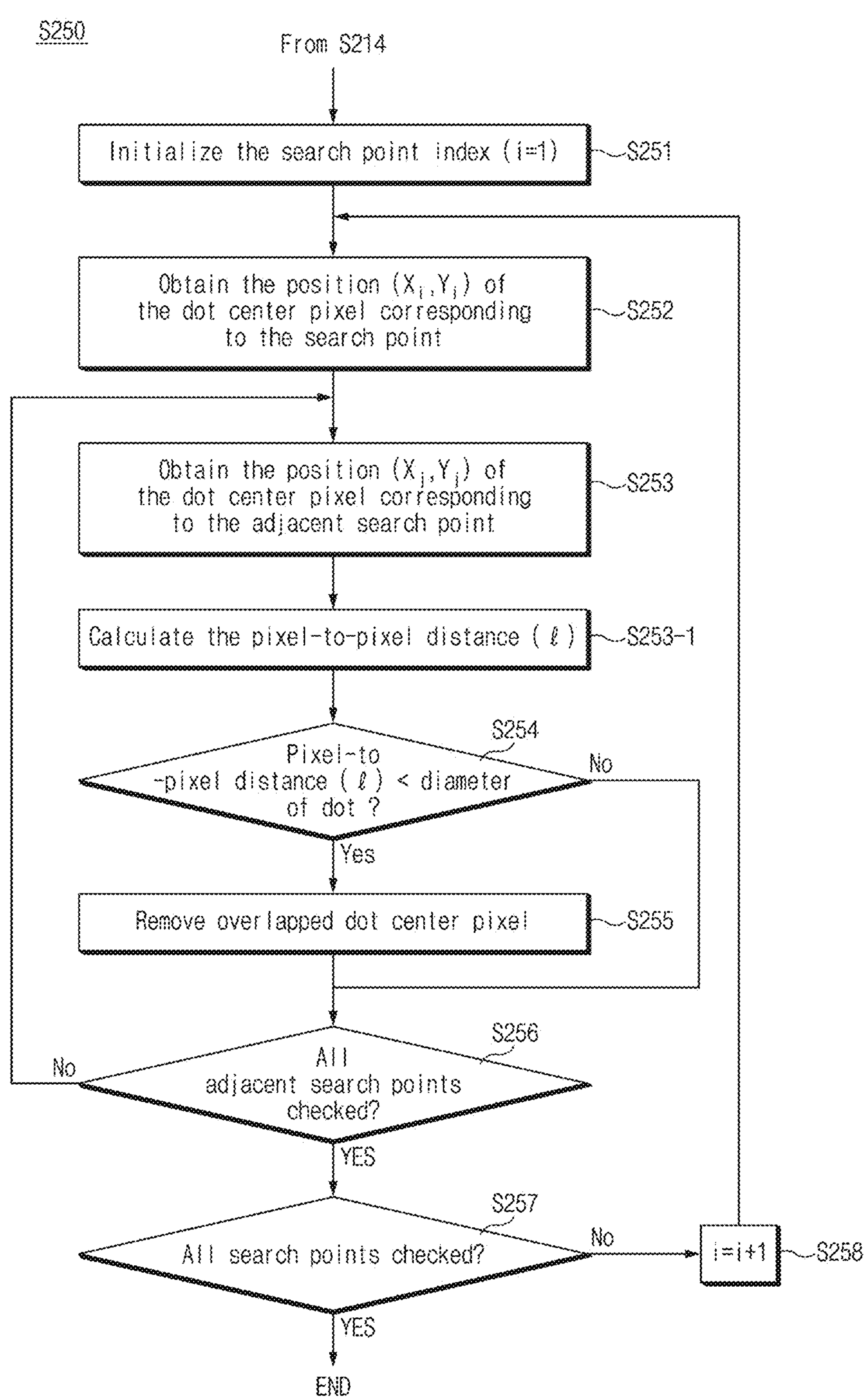
FIG. 20 is a flowchart illustrating an example of an operation S250 shown in FIG. 14 based on some implementations of the disclosed technology.

FIG. 20 is a flowchart illustrating an example of an operation S250, shown in FIG. 14, based on some implementations of the disclosed technology.

Referring to FIG. 20, the overlapped dot center pixel removing unit 140 may initialize (i.e., i=1) the search point index (i) serving as identification (ID) information of the search point SP (S251). Here, it should be noted that each operation of FIG. 20 can be performed only for the valid search point (SP_V) determined in operation S240, and the search point SP mentioned in FIG. 20 is the valid search point (SP_V).

The overlapped dot center pixel removing unit 140 may obtain the position ($X_i$, $Y_i$) of the dot center pixel corresponding to the search point SP corresponding to the current search point index (S252).

The overlapped dot center pixel removing unit 140 may obtain the position ($X_j$, $Y_j$) of each dot center pixel corresponding to adjacent search points adjacent to the search point SP corresponding to the current search point index (S253). Here, the adjacent search point may be a search point that is located to be adjacent in up, down, left, and right directions or in a diagonal direction with respect to the search point SP corresponding to the current search point index.

The overlapped dot center pixel removing unit 140 may calculate a pixel-to-pixel distance (I) that indicates a distance between the position ($X_i$, $Y_i$) of the dot center pixel corresponding to a search point SP corresponding to the current search point index and the position ($X_j$, $Y_j$) of the dot center pixel corresponding to an adjacent search point (S253-1).

The overlapped dot center pixel removing unit 140 may compare the pixel-to-pixel distance (I) with the diameter of each dot (DOT) to determine whether two pixels are close to each other (S254). Here, the diameter of each dot (DOT) may be an experimentally predetermined value indicating a maximum diameter of each dot (DOT).

If the distance (I) between pixels (i.e., the pixel-to-pixel distance 'I') is smaller than the diameter of each dot (DOT) (Yes in S254), the dot center pixels may correspond to one dot and may overlap with each other so that the overlapped dot center pixel removing unit 140 can remove one of the overlapped dot center pixels (S255). In some implementations, the overlapped dot center pixel removing unit 140 may select only a dot center pixel having a higher charge value from among dot center pixels.

If the distance (1) between pixels is greater than or equal to the diameter of the dot (DOT) (No in S254), the dot center pixels might not overlap with each other, and therefore, operation S255 might not be performed.

The overlapped dot center pixel removing unit 140 may determine whether operation S253 has been performed on all search points adjacent to the search point SP (S256).

If operation S253 is not performed on all search points adjacent to the search point SP (No in S256), operation S253 may be performed on other search points adjacent to the search point SP. Thereafter, operations S253 to S256 may be repeatedly performed on other search points adjacent to the search point SP, and operations S253 to S256 may be performed on all search points adjacent to the search point SP. As a result, the overlapped dot center pixel removing unit 140 may remove the overlapped dot center pixels one by one in relation to the search point SP.

If operation S253 is performed on all adjacent search points to the search point SP (Yes in S256) and operation $252 is not performed on all search points (SPs) (No in S257), the overlapped dot center pixel removing unit 140 may increase the current search point index (i) by 1 (S258) and may return to operation S252. These operations may be repeated until operation S252 is performed on all search points. Then, if operation S252 is performed on all search points (Yes in S257), dot center pixel information for all dot center pixels may be stored in the dot data memory 570 to prevent the positions ($X_i$, $Y_i$) and the amplitude values ($amp_i$) of the dot center pixels from overlapping with each other.

As described above with reference to FIGS. 13 to 20, when the dot center pixel is determined using the charge value as the intensity of depth data, only one frame may be required instead of two frames, and thus, the dot center pixel can be detected using only the line memory rather than the frame memory.

As is apparent from the above description, the depth image sensing device can efficiently and accurately detect the distance regardless of the scene, an image signal processor, and an image signal processing method.

Figure 21:
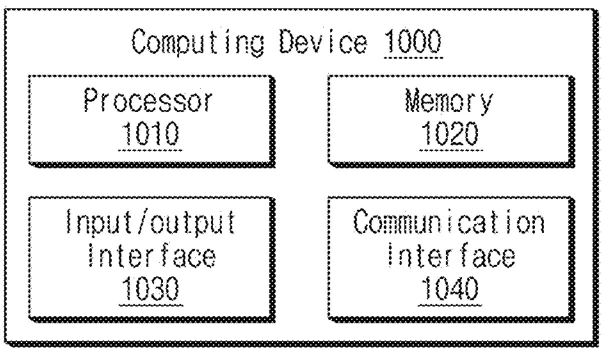
FIG. 21 is a block diagram illustrating an example of a computing device including the dot center pixel detector of FIG. 4.

FIG. 21 is a block diagram illustrating an example of a computing device including the dot center pixel detector of FIG. 4.

Referring to FIG. 21, the computing device 1000 may represent an example of a hardware configuration for performing the operation of the dot center pixel detector 100 of FIG. 4.

The computing device 1000 may be mounted on a chip included in an imaging device. According to one embodiment, the computing device 1000 may be mounted on a chip equipped with a depth image sensing device or a chip equipped with an image signal processor, but the scope of the present invention is not limited thereto.

Additionally, the internal configuration or arrangement of the depth image sensing device and the image signal processor described in FIG. 9 or FIG. 13 may vary depending on the embodiment. For example, at least a portion of the image sensing device may be included in the image signal processor. Alternatively, at least a portion of the image signal processor may be included in the image sensing device. In this case, at least a portion of the image signal processor may be mounted together on a chip on which the image sensing device is mounted.

The computing device 1000 may include a processor 1010, a memory 1020, an input/output interface 1030, and a communication interface 1040.

The processor 1010 may process data and/or instructions required to perform the operations of the components 110 to 140 of the dot center pixel detector 100 described in FIG. 4.

The memory 1020 may store data and/or instructions required to perform operations of the components 110 to 140 of the dot center pixel detector 100, and may be accessed by the processor 1010. For example, the memory 1020 may be volatile memory (e.g., Dynamic Random Access Memory (DRAM), Static Random Access Memory (SRAM), etc.) or non-volatile memory (e.g., Programmable Read Only Memory (PROM), Erasable PROM (EPROM), EEPROM (Electrically Erasable PROM), flash memory, etc.).

That is, the computer program for performing the operation of the dot center pixel detector 100 disclosed in this document is recorded in the memory 1020, executed and processed by the processor 1010, thereby implementing the operations of the dot center pixel detector 100.

The input/output interface 1030 is an interface that connects an external input device (e.g., keyboard, mouse, touch panel, etc.) and/or an external output device (e.g., display) to the processor 1010 to allow data to be transmitted and received.

The communication interface 1040 is a component that can transmit and receive various data with an external device (eg, an application processor, external memory, etc.), and may be a device that supports wired or wireless communication.

The embodiments of the disclosed technology may provide a variety of effects capable of being directly or indirectly recognized through the above-mentioned patent document.

Although a number of illustrative embodiments have been described, it should be understood that modifications and enhancements to the disclosed embodiments and other embodiments can be devised based on what is described and/or illustrated in this patent document.

What is claimed is:

1. An image signal processor comprising:

a dot center pixel detector configured to determine a dot center pixel having a highest intensity of depth data in each of a plurality of kernels; and a depth image generator configured to calculate a distance to a scene using the depth data of the dot center pixel, and wherein the dot center pixel detector includes a valid pixel determination unit configured to determine whether the dot center pixel is a valid pixel by comparing the intensity of the depth data of the dot center pixel with a valid threshold value.

2. The image signal processor according to claim 1, wherein the intensity of the depth data refers to an amplitude value of first to fourth depth data generated by using first to fourth modulation control signals having different phase differences with respect to a dot pattern light emitted to the scene.

3. The image signal processor according to claim 1, wherein the dot center pixel detector includes:

a search point management unit configured to determine a search point included in each of the plurality of kernels.

4. The image signal processor according to claim 3, wherein:

a distance between the search point and an adjacent search point, which is adjacent to the search point, is smaller than a distance between dots of a dot pattern light emitted to the scene.

5. The image signal processor according to claim 1, wherein the dot center pixel detector includes:

a nearby pixel comparison unit configured to determine the dot center pixel by comparing intensities of the depth data of a plurality of pixels included in each of the plurality of kernels with each other.

6. The image signal processor according to claim 1, wherein the dot center pixel detector includes:

an overlapped dot center pixel removing unit configured to remove at least one overlapped dot center pixel from among the dot center pixels, which are valid pixels.

7. The image signal processor according to claim 6, wherein:

the overlapped dot center pixel is a pixel having the same position as another dot center pixel.

8. An image signal processing method comprising:

determining at least one dot center pixel having a highest intensity of depth data in each of a plurality of kernels;

determining whether the dot center pixel is a valid pixel by comparing the intensity of the depth data of the dot center pixel with a valid threshold value;

removing an overlapped dot center pixel from among the dot center pixels, which are valid pixels; and calculating a distance to a scene using the depth data of the dot center pixel.

9. The image signal processing method according to claim 8, wherein the valid pixel is determined by repeatedly performing the determining of the dot center pixel having the highest intensity of the depth data and the determining of whether the dot center pixel is the valid pixel.

* * * * *